United States Patent
Asano

(10) Patent No.: US 10,423,488 B2
(45) Date of Patent: Sep. 24, 2019

(54) ERROR DETECTION DEVICE, STORAGE APPARATUS AND ERROR CORRECTION METHOD

(71) Applicant: NEC Corporation, Tokyo (JP)

(72) Inventor: Hiroki Asano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 62 days.

(21) Appl. No.: 15/446,058

(22) Filed: Mar. 1, 2017

(65) Prior Publication Data

US 2017/0255521 A1 Sep. 7, 2017

(30) Foreign Application Priority Data

Mar. 1, 2016 (JP) .................................. 2016-038939

(51) Int. Cl.
*G06F 11/10* (2006.01)
*G06F 3/06* (2006.01)

(52) U.S. Cl.
CPC .......... *G06F 11/1076* (2013.01); *G06F 3/064* (2013.01); *G06F 3/0619* (2013.01); *G06F 3/0673* (2013.01); *G06F 11/1048* (2013.01)

(58) Field of Classification Search
CPC ..... G06F 3/0619; G06F 3/064; G06F 11/1048
See application file for complete search history.

(56) References Cited

U.S. PATENT DOCUMENTS

| | | | | |
|---|---|---|---|---|
| 6,456,449 | B1 * | 9/2002 | Belser ................ | G11B 5/59655 360/75 |
| 2014/0068378 | A1 * | 3/2014 | Yoshii ................. | G06F 11/1012 714/764 |
| 2014/0380119 | A1 * | 12/2014 | Sugahara ............ | G06F 11/1048 714/763 |
| 2017/0220416 | A1 * | 8/2017 | Yao ..................... | G06F 11/1068 |

FOREIGN PATENT DOCUMENTS

| | | |
|---|---|---|
| JP | 04-188243 | 7/1992 |
| JP | 05-173870 | 7/1993 |
| JP | 10-232789 | 9/1998 |
| JP | 11-232129 | 8/1999 |
| JP | 2006-260139 | 9/2006 |
| JP | 2008-005419 | 1/2008 |

OTHER PUBLICATIONS

Japanese Notice of Allowance 2016-038939 dated Jan. 10, 2017.

* cited by examiner

*Primary Examiner* — Guy J Lawrence
(74) *Attorney, Agent, or Firm* — Young & Thompson

(57) ABSTRACT

An error detection device includes a generation unit and a detection-correction unit. When writing data into a storage unit, the generation unit generates error detection information for each piece of division-data into which write-data are divided. The error detection information is information which is available in determining whether a bit error includes in the division-data, and by which a position where the bit error is caused can be detected based on plural pieces of the error detection information of the plural division-data (Continued)

composing the write-data. Using the error detection information, the detection-correction unit can determine whether the bit error is caused in the division-data. Using plural pieces of the error detection information of the data including the division-data in which it is detected that the bit error is caused, the detection-correction unit can detect the position where the error is caused, and can correct the bit error.

4 Claims, 26 Drawing Sheets

Fig. 8

| E[0] | E[1] | E[2] | E[3] | E[4] | E[5] | E[6] | E[7] | POSITION OF ERROR |
|---|---|---|---|---|---|---|---|---|
| 0 | 0 | 0 | 1 | 1 | 0 | 1 | 0 | D[11] |
| 0 | 0 | 1 | 0 | 1 | 0 | 1 | 0 | D[10] |
| 0 | 1 | 0 | 0 | 1 | 0 | 1 | 0 | D[9] |
| 1 | 0 | 0 | 0 | 1 | 0 | 1 | 0 | D[8] |
| 0 | 0 | 0 | 1 | 1 | 1 | 0 | 0 | D[7] |
| 0 | 0 | 1 | 0 | 1 | 1 | 0 | 0 | D[6] |
| 0 | 1 | 0 | 0 | 1 | 1 | 0 | 0 | D[5] |
| 1 | 0 | 0 | 0 | 1 | 1 | 0 | 0 | D[4] |
| 0 | 0 | 0 | 1 | 1 | 1 | 1 | 1 | D[3] |
| 0 | 0 | 1 | 0 | 1 | 1 | 1 | 1 | D[2] |
| 0 | 1 | 0 | 0 | 1 | 1 | 1 | 1 | D[1] |
| 1 | 0 | 0 | 0 | 1 | 1 | 1 | 1 | D[0] |

Fig. 9

| | D[12] | D[13] | D[14] | D[15] | D[16] | D[17] | D[18] | D[19] | D[20] | D[21] | D[22] | D[23] |
|---|---|---|---|---|---|---|---|---|---|---|---|---|
| E[0] | 1 | 0 | 0 | 0 | 1 | 0 | 0 | 0 | 1 | 0 | 0 | 0 |
| E[1] | 0 | 1 | 0 | 0 | 0 | 1 | 0 | 0 | 0 | 1 | 0 | 0 |
| E[2] | 0 | 0 | 1 | 0 | 0 | 0 | 1 | 0 | 0 | 0 | 1 | 0 |
| E[3] | 0 | 0 | 0 | 1 | 0 | 0 | 0 | 1 | 0 | 0 | 0 | 1 |
| E[4] | 1 | 1 | 1 | 1 | 0 | 0 | 0 | 0 | 0 | 0 | 0 | 0 |
| E[5] | 0 | 0 | 0 | 0 | 1 | 1 | 1 | 1 | 1 | 1 | 1 | 1 |
| E[6] | 0 | 0 | 0 | 0 | 1 | 1 | 1 | 1 | 0 | 0 | 0 | 0 |
| E[7] | 1 | 1 | 1 | 1 | 0 | 0 | 0 | 0 | 1 | 1 | 1 | 1 |
| POSITION OF ERROR | D[12] | D[13] | D[14] | D[15] | D[16] | D[17] | D[18] | D[19] | D[20] | D[21] | D[22] | D[23] |

Fig. 10

| | D[24] | D[25] | D[26] | D[27] | D[28] | D[29] | D[30] | D[31] |
|---|---|---|---|---|---|---|---|---|
| E[0] | 1 | 0 | 0 | 0 | 1 | 1 | 1 | 0 |
| E[1] | 0 | 1 | 0 | 0 | 1 | 1 | 0 | 1 |
| E[2] | 0 | 0 | 1 | 0 | 1 | 0 | 1 | 1 |
| E[3] | 0 | 0 | 0 | 1 | 0 | 1 | 1 | 1 |
| E[4] | 0 | 0 | 0 | 0 | 0 | 0 | 0 | 0 |
| E[5] | 0 | 0 | 0 | 0 | 0 | 0 | 0 | 0 |
| E[6] | 1 | 1 | 1 | 1 | 0 | 0 | 0 | 0 |
| E[7] | 1 | 1 | 1 | 1 | 0 | 0 | 0 | 0 |
| POSITION OF ERROR | | | | | | | | |

Fig. 11

| | D[32] | D[33] | D[34] | D[35] | D[36] | D[37] | D[38] | D[39] | D[40] | D[41] | D[42] | D[43] |
|---|---|---|---|---|---|---|---|---|---|---|---|---|
| E[0] | 1 | 1 | 1 | 1 | 1 | 1 | 1 | 1 | 1 | 1 | 1 | 1 |
| E[1] | 1 | 1 | 1 | 1 | 1 | 1 | 1 | 1 | 0 | 0 | 0 | 0 |
| E[2] | 1 | 1 | 1 | 1 | 0 | 0 | 0 | 0 | 1 | 1 | 1 | 1 |
| E[3] | 1 | 1 | 1 | 1 | 0 | 0 | 0 | 0 | 0 | 0 | 0 | 0 |
| E[4] | 1 | 0 | 0 | 0 | 1 | 0 | 0 | 0 | 1 | 0 | 0 | 0 |
| E[5] | 0 | 1 | 0 | 0 | 0 | 1 | 0 | 0 | 0 | 1 | 0 | 0 |
| E[6] | 0 | 0 | 1 | 0 | 0 | 0 | 1 | 0 | 0 | 0 | 1 | 0 |
| E[7] | 0 | 0 | 0 | 1 | 0 | 0 | 0 | 1 | 0 | 0 | 0 | 1 |
| POSITION OF ERROR | D[32] | D[33] | D[34] | D[35] | D[36] | D[37] | D[38] | D[39] | D[40] | D[41] | D[42] | D[43] |

Fig. 12

| | | | | | | | | |
|---|---|---|---|---|---|---|---|---|
| $E_{[0]}$ | 1 | 1 | 1 | 1 | 0 | 0 | 0 | 0 |
| $E_{[1]}$ | 0 | 0 | 0 | 1 | 1 | 1 | 1 | 1 |
| $E_{[2]}$ | 0 | 0 | 0 | 1 | 1 | 1 | 0 | 0 |
| $E_{[3]}$ | 1 | 1 | 1 | 0 | 0 | 0 | 1 | 1 |
| $E_{[4]}$ | 1 | 0 | 0 | 1 | 0 | 0 | 1 | 0 |
| $E_{[5]}$ | 0 | 1 | 0 | 0 | 1 | 0 | 1 | 0 |
| $E_{[6]}$ | 0 | 0 | 1 | 0 | 0 | 1 | 0 | 1 |
| $E_{[7]}$ | 0 | 0 | 0 | 1 | 0 | 0 | 0 | 1 |
| POSITION OF ERROR | $D_{[44]}$ | $D_{[45]}$ | $D_{[46]}$ | $D_{[47]}$ | $D_{[48]}$ | $D_{[49]}$ | $D_{[50]}$ | $D_{[51]}$ | $D_{[52]}$ | $D_{[53]}$ | $D_{[54]}$ | $D_{[55]}$ |

Fig. 13

| E[0] | E[1] | E[2] | E[3] | E[4] | E[5] | E[6] | E[7] | POSITION OF ERROR |
|---|---|---|---|---|---|---|---|---|
| 0 | 0 | 1 | 1 | 1 | 0 | 0 | 0 | $D_{[56]}$ |
| 0 | 0 | 1 | 1 | 0 | 1 | 0 | 0 | $D_{[57]}$ |
| 0 | 0 | 1 | 1 | 0 | 0 | 1 | 0 | $D_{[58]}$ |
| 0 | 0 | 1 | 1 | 0 | 0 | 0 | 1 | $D_{[59]}$ |
| 0 | 0 | 0 | 0 | 1 | 1 | 1 | 0 | $D_{[60]}$ |
| 0 | 0 | 0 | 0 | 1 | 1 | 0 | 1 | $D_{[61]}$ |
| 0 | 0 | 0 | 0 | 1 | 0 | 1 | 1 | $D_{[62]}$ |
| 0 | 0 | 0 | 0 | 0 | 1 | 1 | 1 | $D_{[63]}$ |
| 1 | 0 | 0 | 0 | 0 | 0 | 0 | 0 | $P_{[0]}$ |
| 0 | 1 | 0 | 0 | 0 | 0 | 0 | 0 | $P_{[1]}$ |
| 0 | 0 | 1 | 0 | 0 | 0 | 0 | 0 | $P_{[2]}$ |
| 0 | 0 | 0 | 1 | 0 | 0 | 0 | 0 | $P_{[3]}$ |
| 0 | 0 | 0 | 0 | 1 | 0 | 0 | 0 | $P_{[4]}$ |
| 0 | 0 | 0 | 0 | 0 | 1 | 0 | 0 | $P_{[5]}$ |
| 0 | 0 | 0 | 0 | 0 | 0 | 1 | 0 | $P_{[6]}$ |
| 0 | 0 | 0 | 0 | 0 | 0 | 0 | 1 | $P_{[7]}$ |

Fig. 14

| | D[0] | D[1] | D[2] | D[3] | D[4] | D[5] | D[6] | D[7] | D[8] | D[9] | D[10] | D[11] |
|---|---|---|---|---|---|---|---|---|---|---|---|---|
| E[0] | 1 | 0 | 0 | 0 | 1 | 0 | 0 | 0 | 1 | 0 | 0 | 0 |
| E[1] | 0 | 1 | 0 | 0 | 0 | 1 | 0 | 0 | 0 | 1 | 0 | 0 |
| E[2] | 0 | 0 | 1 | 0 | 0 | 0 | 1 | 0 | 0 | 0 | 1 | 0 |
| E[3] | 0 | 0 | 0 | 1 | 0 | 0 | 0 | 1 | 0 | 0 | 0 | 1 |
| E[4] | 1 | 1 | 1 | 1 | 1 | 1 | 1 | 1 | 1 | 1 | 1 | 1 |
| E[5] | 1 | 1 | 1 | 1 | 1 | 1 | 1 | 1 | 0 | 0 | 0 | 0 |
| E[6] | 1 | 1 | 1 | 1 | 0 | 0 | 0 | 0 | 1 | 1 | 1 | 1 |
| E[7] | 1 | 1 | 1 | 1 | 0 | 0 | 0 | 0 | 0 | 0 | 0 | 0 |
| POSITION OF ERROR | D[0] | D[1] | D[2] | D[3] | D[4] | D[5] | D[6] | D[7] | D[8] | D[9] | D[10] | D[11] |

Fig. 15

| | D[12] | D[13] | D[14] | D[15] | D[16] | D[17] | D[18] | D[19] | D[20] | D[21] | D[22] | D[23] |
|---|---|---|---|---|---|---|---|---|---|---|---|---|
| E[0] | 1 | 0 | 0 | 0 | 1 | 1 | 1 | 1 | 1 | 1 | 1 | 1 |
| E[1] | 0 | 1 | 0 | 0 | 1 | 1 | 1 | 1 | 1 | 1 | 1 | 1 |
| E[2] | 0 | 0 | 1 | 0 | 1 | 1 | 1 | 1 | 0 | 0 | 0 | 0 |
| E[3] | 0 | 0 | 0 | 1 | 1 | 1 | 1 | 1 | 0 | 0 | 0 | 0 |
| E[4] | 1 | 1 | 1 | 1 | 1 | 0 | 0 | 0 | 1 | 0 | 0 | 0 |
| E[5] | 0 | 0 | 0 | 0 | 0 | 1 | 0 | 0 | 0 | 1 | 0 | 0 |
| E[6] | 0 | 0 | 0 | 0 | 0 | 0 | 1 | 0 | 0 | 0 | 1 | 0 |
| E[7] | 1 | 1 | 1 | 1 | 0 | 0 | 0 | 1 | 0 | 0 | 0 | 1 |
| POSITION OF ERROR | D[12] | D[13] | D[14] | D[15] | D[16] | D[17] | D[18] | D[19] | D[20] | D[21] | D[22] | D[23] |

Fig. 16

| | E[0] | E[1] | E[2] | E[3] | E[4] | E[5] | E[6] | E[7] | POSITION OF ERROR |
|---|---|---|---|---|---|---|---|---|---|
| | 1 | 0 | 1 | 0 | 1 | 0 | 0 | 0 | $D_{[24]}$ |
| | 1 | 0 | 1 | 0 | 0 | 1 | 0 | 0 | $D_{[25]}$ |
| | 1 | 0 | 1 | 0 | 0 | 0 | 1 | 0 | $D_{[26]}$ |
| | 1 | 0 | 1 | 0 | 0 | 0 | 0 | 1 | $D_{[27]}$ |
| | 1 | 0 | 0 | 1 | 1 | 0 | 0 | 0 | $D_{[28]}$ |
| | 1 | 0 | 0 | 1 | 0 | 1 | 0 | 0 | $D_{[29]}$ |
| | 1 | 0 | 0 | 1 | 0 | 0 | 1 | 0 | $D_{[30]}$ |
| | 1 | 0 | 0 | 1 | 0 | 0 | 0 | 1 | $D_{[31]}$ |
| | 1 | 0 | 0 | 0 | 0 | 0 | 0 | 0 | $P_{[0]}$ |
| | 0 | 1 | 0 | 0 | 0 | 0 | 0 | 0 | $P_{[1]}$ |
| | 0 | 0 | 1 | 0 | 0 | 0 | 0 | 0 | $P_{[2]}$ |
| | 0 | 0 | 0 | 1 | 0 | 0 | 0 | 0 | $P_{[3]}$ |
| | 0 | 0 | 0 | 0 | 1 | 0 | 0 | 0 | $P_{[4]}$ |
| | 0 | 0 | 0 | 0 | 0 | 1 | 0 | 0 | $P_{[5]}$ |
| | 0 | 0 | 0 | 0 | 0 | 0 | 1 | 0 | $P_{[6]}$ |
| | 0 | 0 | 0 | 0 | 0 | 0 | 0 | 1 | $P_{[7]}$ |

Fig. 17

| E[0] | E[1] | E[2] | E[3] | E[4] | E[5] | E[6] | E[7] | E[8] | E[9] | POSITION OF ERROR |
|---|---|---|---|---|---|---|---|---|---|---|
| 0 | 0 | 0 | 0 | 1 | 1 | 1 | 0 | 1 | 1 | D[14] |
| 0 | 0 | 0 | 1 | 0 | 1 | 1 | 0 | 1 | 1 | D[13] |
| 0 | 0 | 1 | 0 | 0 | 1 | 1 | 0 | 1 | 1 | D[12] |
| 0 | 1 | 0 | 0 | 0 | 1 | 1 | 0 | 1 | 1 | D[11] |
| 1 | 0 | 0 | 0 | 0 | 1 | 1 | 0 | 1 | 1 | D[10] |
| 0 | 0 | 0 | 0 | 1 | 1 | 1 | 1 | 0 | 1 | D[9] |
| 0 | 0 | 0 | 1 | 0 | 1 | 1 | 1 | 0 | 1 | D[8] |
| 0 | 0 | 1 | 0 | 0 | 1 | 1 | 1 | 0 | 1 | D[7] |
| 0 | 1 | 0 | 0 | 0 | 1 | 1 | 1 | 0 | 1 | D[6] |
| 1 | 0 | 0 | 0 | 0 | 1 | 1 | 1 | 0 | 1 | D[5] |
| 0 | 0 | 0 | 0 | 1 | 1 | 1 | 1 | 1 | 0 | D[4] |
| 0 | 0 | 0 | 1 | 0 | 1 | 1 | 1 | 1 | 0 | D[3] |
| 0 | 0 | 1 | 0 | 0 | 1 | 1 | 1 | 1 | 0 | D[2] |
| 0 | 1 | 0 | 0 | 0 | 1 | 1 | 1 | 1 | 0 | D[1] |
| 1 | 0 | 0 | 0 | 0 | 1 | 1 | 1 | 1 | 0 | D[0] |

Fig. 18

| | D[15] | D[16] | D[17] | D[18] | D[19] | D[20] | D[21] | D[22] | D[23] | D[24] | D[25] | D[26] | D[27] | D[28] | D[29] |
|---|---|---|---|---|---|---|---|---|---|---|---|---|---|---|---|
| E[0] | 1 | 0 | 0 | 0 | 0 | 1 | 0 | 0 | 0 | 0 | 1 | 0 | 0 | 0 | 0 |
| E[1] | 0 | 1 | 0 | 0 | 0 | 0 | 1 | 0 | 0 | 0 | 0 | 1 | 0 | 0 | 0 |
| E[2] | 0 | 0 | 1 | 0 | 0 | 0 | 0 | 1 | 0 | 0 | 0 | 0 | 1 | 0 | 0 |
| E[3] | 0 | 0 | 0 | 1 | 0 | 0 | 0 | 0 | 1 | 0 | 0 | 0 | 0 | 1 | 0 |
| E[4] | 0 | 0 | 0 | 0 | 1 | 0 | 0 | 0 | 0 | 1 | 0 | 0 | 0 | 0 | 1 |
| E[5] | 1 | 1 | 1 | 1 | 1 | 0 | 0 | 0 | 0 | 0 | 1 | 1 | 1 | 1 | 1 |
| E[6] | 0 | 0 | 0 | 0 | 0 | 1 | 1 | 1 | 1 | 1 | 1 | 1 | 1 | 1 | 1 |
| E[7] | 1 | 1 | 1 | 1 | 1 | 1 | 1 | 1 | 1 | 1 | 0 | 0 | 0 | 0 | 0 |
| E[8] | 1 | 1 | 1 | 1 | 1 | 1 | 1 | 1 | 1 | 1 | 0 | 0 | 0 | 0 | 0 |
| E[9] | 1 | 1 | 1 | 1 | 1 | 1 | 1 | 1 | 1 | 1 | 0 | 0 | 0 | 0 | 0 |
| POSITION OF ERROR | D[15] | D[16] | D[17] | D[18] | D[19] | D[20] | D[21] | D[22] | D[23] | D[24] | D[25] | D[26] | D[27] | D[28] | D[29] |

Fig. 19

| | D[30] | D[31] | D[32] | D[33] | D[34] | D[35] | D[36] | D[37] | D[38] | D[39] | D[40] | D[41] | D[42] | D[43] | D[44] |
|---|---|---|---|---|---|---|---|---|---|---|---|---|---|---|---|
| E[0] | 1 | 0 | 0 | 0 | 0 | 1 | 0 | 0 | 0 | 0 | 1 | 0 | 0 | 0 | 0 |
| E[1] | 0 | 1 | 0 | 0 | 0 | 0 | 1 | 0 | 0 | 0 | 0 | 1 | 0 | 0 | 0 |
| E[2] | 0 | 0 | 1 | 0 | 0 | 0 | 0 | 1 | 0 | 0 | 0 | 0 | 1 | 0 | 0 |
| E[3] | 0 | 0 | 0 | 1 | 0 | 0 | 0 | 0 | 1 | 0 | 0 | 0 | 0 | 1 | 0 |
| E[4] | 0 | 0 | 0 | 0 | 1 | 0 | 0 | 0 | 0 | 1 | 0 | 0 | 0 | 0 | 1 |
| E[5] | 1 | 1 | 1 | 1 | 1 | 1 | 1 | 1 | 1 | 1 | 1 | 1 | 1 | 1 | 1 |
| E[6] | 0 | 0 | 0 | 0 | 0 | 0 | 0 | 0 | 0 | 0 | 0 | 0 | 0 | 0 | 0 |
| E[7] | 1 | 1 | 1 | 1 | 1 | 0 | 0 | 0 | 0 | 0 | 0 | 0 | 0 | 0 | 0 |
| E[8] | 0 | 0 | 0 | 0 | 0 | 1 | 1 | 1 | 1 | 1 | 0 | 0 | 0 | 0 | 0 |
| E[9] | 0 | 0 | 0 | 0 | 0 | 0 | 0 | 0 | 0 | 0 | 1 | 1 | 1 | 1 | 1 |
| POSITION OF ERROR | D[30] | D[31] | D[32] | D[33] | D[34] | D[35] | D[36] | D[37] | D[38] | D[39] | D[40] | D[41] | D[42] | D[43] | D[44] |

Fig. 20

| | D[59] | D[58] | D[57] | D[56] | D[55] | D[54] | D[53] | D[52] | D[51] | D[50] | D[49] | D[48] | D[47] | D[46] | D[45] |
|---|---|---|---|---|---|---|---|---|---|---|---|---|---|---|---|
| E[0] | 0 | 0 | 0 | 0 | 1 | 0 | 0 | 0 | 0 | 1 | 0 | 0 | 0 | 0 | 1 |
| E[1] | 0 | 0 | 0 | 1 | 0 | 0 | 0 | 0 | 1 | 0 | 0 | 0 | 0 | 1 | 0 |
| E[2] | 0 | 0 | 1 | 0 | 0 | 0 | 0 | 1 | 0 | 0 | 0 | 0 | 1 | 0 | 0 |
| E[3] | 0 | 1 | 0 | 0 | 0 | 0 | 1 | 0 | 0 | 0 | 0 | 1 | 0 | 0 | 0 |
| E[4] | 1 | 0 | 0 | 0 | 0 | 1 | 0 | 0 | 0 | 0 | 1 | 0 | 0 | 0 | 0 |
| E[5] | 0 | 0 | 0 | 0 | 0 | 0 | 0 | 0 | 0 | 0 | 0 | 0 | 0 | 0 | 0 |
| E[6] | 1 | 1 | 1 | 1 | 1 | 1 | 1 | 1 | 1 | 1 | 1 | 1 | 1 | 1 | 1 |
| E[7] | 0 | 0 | 0 | 0 | 0 | 0 | 0 | 0 | 0 | 0 | 1 | 1 | 1 | 1 | 1 |
| E[8] | 0 | 0 | 0 | 0 | 0 | 1 | 1 | 1 | 1 | 1 | 0 | 0 | 0 | 0 | 0 |
| E[9] | 1 | 1 | 1 | 1 | 1 | 0 | 0 | 0 | 0 | 0 | 0 | 0 | 0 | 0 | 0 |
| POSITION OF ERROR | D[59] | D[58] | D[57] | D[56] | D[55] | D[54] | D[53] | D[52] | D[51] | D[50] | D[49] | D[48] | D[47] | D[46] | D[45] |

Fig. 21

| | E[0] | E[1] | E[2] | E[3] | E[4] | E[5] | E[6] | E[7] | E[8] | E[9] |
|---|---|---|---|---|---|---|---|---|---|---|
| POSITION OF ERROR | | | | | | | | | | |
| D[60] | 1 | 0 | 0 | 0 | 0 | 0 | 0 | 1 | 1 | 0 |
| D[61] | 0 | 1 | 0 | 0 | 0 | 0 | 0 | 1 | 1 | 0 |
| D[62] | 0 | 0 | 1 | 0 | 0 | 0 | 0 | 1 | 1 | 0 |
| D[63] | 0 | 0 | 0 | 1 | 0 | 0 | 0 | 1 | 1 | 0 |
| D[64] | 1 | 1 | 1 | 1 | 0 | 1 | 0 | 0 | 0 | 0 |
| D[65] | 1 | 1 | 1 | 1 | 0 | 0 | 1 | 0 | 0 | 0 |
| D[66] | 1 | 1 | 1 | 1 | 0 | 0 | 0 | 1 | 0 | 0 |
| D[67] | 1 | 1 | 1 | 1 | 0 | 0 | 0 | 0 | 1 | 0 |
| D[68] | 1 | 1 | 1 | 1 | 0 | 0 | 0 | 0 | 0 | 1 |
| D[69] | 1 | 1 | 1 | 0 | 1 | 1 | 0 | 0 | 0 | 0 |
| D[70] | 1 | 1 | 1 | 0 | 1 | 0 | 1 | 0 | 0 | 0 |
| D[71] | 1 | 1 | 1 | 0 | 1 | 0 | 0 | 1 | 0 | 0 |
| D[72] | 1 | 1 | 1 | 0 | 1 | 0 | 0 | 0 | 1 | 0 |
| D[73] | 1 | 1 | 1 | 0 | 1 | 0 | 0 | 0 | 0 | 1 |

Fig. 22

| E[0] | E[1] | E[2] | E[3] | E[4] | E[5] | E[6] | E[7] | E[8] | E[9] | POSITION OF ERROR |
|---|---|---|---|---|---|---|---|---|---|---|
| 0 | 1 | 1 | 1 | 1 | 0 | 0 | 0 | 0 | 1 | $D_{[88]}$ |
| 0 | 1 | 1 | 1 | 1 | 0 | 0 | 0 | 1 | 0 | $D_{[87]}$ |
| 0 | 1 | 1 | 1 | 1 | 0 | 0 | 1 | 0 | 0 | $D_{[86]}$ |
| 0 | 1 | 1 | 1 | 1 | 0 | 1 | 0 | 0 | 0 | $D_{[85]}$ |
| 0 | 1 | 1 | 1 | 1 | 1 | 0 | 0 | 0 | 0 | $D_{[84]}$ |
| 1 | 0 | 1 | 1 | 1 | 0 | 0 | 0 | 0 | 1 | $D_{[83]}$ |
| 1 | 0 | 1 | 1 | 1 | 0 | 0 | 0 | 1 | 0 | $D_{[82]}$ |
| 1 | 0 | 1 | 1 | 1 | 0 | 0 | 1 | 0 | 0 | $D_{[81]}$ |
| 1 | 0 | 1 | 1 | 1 | 0 | 1 | 0 | 0 | 0 | $D_{[80]}$ |
| 1 | 0 | 1 | 1 | 1 | 1 | 0 | 0 | 0 | 0 | $D_{[79]}$ |
| 1 | 1 | 0 | 1 | 1 | 0 | 0 | 0 | 0 | 1 | $D_{[78]}$ |
| 1 | 1 | 0 | 1 | 1 | 0 | 0 | 0 | 1 | 0 | $D_{[77]}$ |
| 1 | 1 | 0 | 1 | 1 | 0 | 0 | 1 | 0 | 0 | $D_{[76]}$ |
| 1 | 1 | 0 | 1 | 1 | 0 | 1 | 0 | 0 | 0 | $D_{[75]}$ |
| 1 | 1 | 0 | 1 | 1 | 1 | 0 | 0 | 0 | 0 | $D_{[74]}$ |

Fig. 23

| | D[89] | D[90] | D[91] | D[92] | D[93] | D[94] | D[95] | D[96] | D[97] | D[98] | D[99] | D[100] | D[101] | D[102] | D[103] |
|---|---|---|---|---|---|---|---|---|---|---|---|---|---|---|---|
| E[0] | 1 | 1 | 1 | 1 | 1 | 1 | 1 | 1 | 1 | 1 | 1 | 1 | 1 | 1 | 1 |
| E[1] | 1 | 1 | 1 | 1 | 1 | 0 | 0 | 0 | 0 | 0 | 0 | 0 | 0 | 0 | 0 |
| E[2] | 0 | 0 | 0 | 0 | 0 | 1 | 1 | 1 | 1 | 1 | 0 | 0 | 0 | 0 | 0 |
| E[3] | 0 | 0 | 0 | 0 | 0 | 0 | 0 | 0 | 0 | 0 | 1 | 1 | 1 | 1 | 1 |
| E[4] | 0 | 0 | 0 | 0 | 0 | 0 | 0 | 0 | 0 | 0 | 0 | 0 | 0 | 0 | 0 |
| E[5] | 1 | 0 | 0 | 0 | 0 | 1 | 0 | 0 | 0 | 0 | 1 | 0 | 0 | 0 | 0 |
| E[6] | 0 | 1 | 0 | 0 | 0 | 0 | 1 | 0 | 0 | 0 | 0 | 1 | 0 | 0 | 0 |
| E[7] | 0 | 0 | 1 | 0 | 0 | 0 | 0 | 1 | 0 | 0 | 0 | 0 | 1 | 0 | 0 |
| E[8] | 0 | 0 | 0 | 1 | 0 | 0 | 0 | 0 | 1 | 0 | 0 | 0 | 0 | 1 | 0 |
| E[9] | 0 | 0 | 0 | 0 | 1 | 0 | 0 | 0 | 0 | 1 | 0 | 0 | 0 | 0 | 1 |
| POSITION OF ERROR | D[89] | D[90] | D[91] | D[92] | D[93] | D[94] | D[95] | D[96] | D[97] | D[98] | D[99] | D[100] | D[101] | D[102] | D[103] |

Fig. 24

| | D[104] | D[105] | D[106] | D[107] | D[108] | D[109] | D[110] | D[111] | D[112] | D[113] | D[114] | D[115] | D[116] | D[117] | D[118] |
|---|---|---|---|---|---|---|---|---|---|---|---|---|---|---|---|
| $E_{[0]}$ | 1 | 1 | 1 | 1 | 1 | 0 | 0 | 0 | 0 | 0 | 0 | 0 | 0 | 0 | 0 |
| $E_{[1]}$ | 0 | 0 | 0 | 0 | 0 | 1 | 1 | 1 | 1 | 1 | 1 | 1 | 1 | 1 | 1 |
| $E_{[2]}$ | 0 | 0 | 0 | 0 | 0 | 1 | 1 | 1 | 1 | 1 | 0 | 0 | 0 | 0 | 0 |
| $E_{[3]}$ | 0 | 0 | 0 | 0 | 0 | 0 | 0 | 0 | 0 | 0 | 1 | 1 | 1 | 1 | 1 |
| $E_{[4]}$ | 1 | 1 | 1 | 1 | 1 | 0 | 0 | 0 | 0 | 0 | 0 | 0 | 0 | 0 | 0 |
| $E_{[5]}$ | 1 | 0 | 0 | 0 | 0 | 1 | 0 | 0 | 0 | 0 | 1 | 0 | 0 | 0 | 0 |
| $E_{[6]}$ | 0 | 1 | 0 | 0 | 0 | 0 | 1 | 0 | 0 | 0 | 0 | 1 | 0 | 0 | 0 |
| $E_{[7]}$ | 0 | 0 | 1 | 0 | 0 | 0 | 0 | 1 | 0 | 0 | 0 | 0 | 1 | 0 | 0 |
| $E_{[8]}$ | 0 | 0 | 0 | 1 | 0 | 0 | 0 | 0 | 1 | 0 | 0 | 0 | 0 | 1 | 0 |
| $E_{[9]}$ | 0 | 0 | 0 | 0 | 1 | 0 | 0 | 0 | 0 | 1 | 0 | 0 | 0 | 0 | 1 |
| POSITION OF ERROR | | | | | | | | | | | | | | | |

Fig. 25

| | E[0] | E[1] | E[2] | E[3] | E[4] | E[5] | E[6] | E[7] | E[8] | E[9] | POSITION OF ERROR |
|---|---|---|---|---|---|---|---|---|---|---|---|
| | 0 | 1 | 0 | 0 | 1 | 1 | 0 | 0 | 0 | 0 | $D_{[119]}$ |
| | 0 | 1 | 0 | 0 | 1 | 0 | 1 | 0 | 0 | 0 | $D_{[120]}$ |
| | 0 | 1 | 0 | 0 | 1 | 0 | 0 | 1 | 0 | 0 | $D_{[121]}$ |
| | 0 | 1 | 0 | 0 | 1 | 0 | 0 | 0 | 1 | 0 | $D_{[122]}$ |
| | 0 | 1 | 0 | 0 | 1 | 0 | 0 | 0 | 0 | 1 | $D_{[123]}$ |
| | 0 | 0 | 1 | 1 | 0 | 1 | 0 | 0 | 0 | 0 | $D_{[124]}$ |
| | 0 | 0 | 1 | 1 | 0 | 0 | 1 | 0 | 0 | 0 | $D_{[125]}$ |
| | 0 | 0 | 1 | 1 | 0 | 0 | 0 | 1 | 0 | 0 | $D_{[126]}$ |
| | 0 | 0 | 1 | 1 | 0 | 0 | 0 | 0 | 1 | 0 | $D_{[127]}$ |

Fig. 26

| | E[0] | E[1] | E[2] | E[3] | E[4] | E[5] | E[6] | E[7] | E[8] | E[9] | POSITION OF ERROR |
|---|---|---|---|---|---|---|---|---|---|---|---|
| | 1 | 0 | 0 | 0 | 0 | 0 | 0 | 0 | 0 | 0 | P[0] |
| | 0 | 1 | 0 | 0 | 0 | 0 | 0 | 0 | 0 | 0 | P[1] |
| | 0 | 0 | 1 | 0 | 0 | 0 | 0 | 0 | 0 | 0 | P[2] |
| | 0 | 0 | 0 | 1 | 0 | 0 | 0 | 0 | 0 | 0 | P[3] |
| | 0 | 0 | 0 | 0 | 1 | 0 | 0 | 0 | 0 | 0 | P[4] |
| | 0 | 0 | 0 | 0 | 0 | 1 | 0 | 0 | 0 | 0 | P[5] |
| | 0 | 0 | 0 | 0 | 0 | 0 | 1 | 0 | 0 | 0 | P[6] |
| | 0 | 0 | 0 | 0 | 0 | 0 | 0 | 1 | 0 | 0 | P[7] |
| | 0 | 0 | 0 | 0 | 0 | 0 | 0 | 0 | 1 | 0 | P[8] |
| | 0 | 0 | 0 | 0 | 0 | 0 | 0 | 0 | 0 | 1 | P[9] |

# ERROR DETECTION DEVICE, STORAGE APPARATUS AND ERROR CORRECTION METHOD

This application is based upon and claims the benefit of priority from Japanese Patent Application No. 2016-038939, filed on Mar. 1, 2016, the disclosure of which is incorporated herein in its entirety by reference.

TECHNICAL FIELD

The present invention relates to an art to detect an error of data which are written into a storage apparatus.

BACKGROUND ART

There is a problem that a bit error (bit inversion or bit garbled) is caused in data which are written into a storage apparatus (semiconductor memory, hard disk apparatus or the like) and which are composed of '0' and '1'. The bit error is a phenomenon that a datum which is '0' in reality is stored as '1', and in contrast a datum which is '1' in reality is stored as '0'.

The various methods have been proposed as a method for detecting the bit error and a method for correcting the detected bit error. As an example, the method using the ECC (Error Check and Correction) code is exemplified.

Here, the reference literature 1 (Japanese Patent Application Laid-Open Publication No. 2006-260139) discloses an art that a plurality of processing apparatuses cooperatively carry out detection of the bit error by using the ECC code.

SUMMARY

For example, in a case of detecting an one-bit error in 64-bit data and correcting the one-bit error with the method using the ECC code, it is necessary to add the 7-bit ECC code to the 64-bit data when writing the data in the storage apparatus. That is, number of cases that the one-bit error is caused in the 64-bit data is 64. Moreover, there is a possibility that the bit error is caused also in the ECC code which is added to the 64-bit data. Accordingly, number of cases that a one-bit error is caused in the ECC code is 7. Furthermore, there is a case that the bit error is not caused in both of the 64-bit data and the ECC code. In order to distinguish and to detect each case, the 7-bit ECC code is required.

By the way, there is a storage apparatus (storage circuit) whose a write-data size and a read-data size are different each other like data are written in a unit of 64 bits when the data are written, and the data are read in a unit of 32 bits, which is a half of 64 bits, when the data are read. In this case, the ECC code is added to the data which are in a unit of the read-data size. Specifically, in the case that 32-bit data which are a first half of 64-bit data, and 32-bit data which are a second half of the 64-bit data can be read separately, the 6-bit ECC code is added to every 32-bit data. That is, the 12-bit ECC code is added to the 64-bit data.

As mentioned above, when the read-data size becomes small while the write-data size written into the storage apparatus is the same, number of bits of the ECC code added to the data, which has the write-data size, increases. That is, a size of storage area, which the data having the write-data size occupy, increases in the storage apparatus. As a result, a problem that improvement in storage density of the storage apparatus is hindered is caused.

The present invention has been conceived in order to solve the problem. That is, a main object of the present invention is to provide an art that, in a storage apparatus which stores data including pieces of division-data (that is, data are divided into pieces of division-data) each of which has a read-data size smaller than a write-data size, restrains deterioration in storage density which is caused due to using information for detecting an error of the data stored by the storage apparatus.

An error detection device of the present invention includes:

circuitry configured to:

generate error detection information when writing write-data which is target to write in a storage unit, the storage unit being configured to store data including pieces of division-data which has a read-data size smaller than a write-data size, the error detection information being information which is associated with each piece of division-data and available in determining whether there is a bit error in the division-data, pieces of the error detection information associated with each piece of division-data in the write-data being collectively used in detecting a position of the bit error;

when reading the division-data from the storage unit, determine whether there is the bit error in the division-data by using the error detection information associated with the division-data being a target to read; and when determining that there is the bit error, detect the position of the bit error by using collectively the pieces of the error detection information associated with each piece of division-data of the write-data including the division-data having the bit error, and correct the bit error based on information on the position of the bit error.

A storage apparatus of the present invention includes:

a storage unit that stores data including pieces of division-data which has a read-data size smaller than a write-data size; and an error detection device including circuitry, the circuitry being configured to:

generate error detection information when writing write-data which is target to write in the storage unit, the error detection information being information which is associated with each piece of division-data and available in determining whether there is a bit error in the division-data, pieces of the error detection information associated with each piece of division-data in the write-data being collectively used in detecting a position of the bit error;

when reading the division-data from the storage unit, determine whether there is the bit error in the division-data by using the error detection information associated with the division-data being target to read; and when determining that there is the bit error, detect the position of the bit error by using collectively the pieces of the error detection information associated with each piece of division-data of the write-data including the division-data having the bit error, and correct the bit error based on information on the position of the bit error.

An error correction method of the present invention includes:

generating error detection information when writing write-data which is target to write in a storage unit, the storage unit being configured to store data including pieces of division-data which has a read-data size smaller than a write-data size, the error detection information being information which is associated with each piece of division-data and available in determining whether there is a bit error in the division-data, pieces of the error detection information associated with each piece of division-data in the write-data being collectively used in detecting a position of the bit error;

when reading the division-data from the storage unit, determining whether there is the bit error in the division-data by using the error detection information associated with the division-data being a target to read; and when determining that there is the bit error, detecting the position of the bit error by using collectively the pieces of the error detection information associated with each piece of division-data of the write-data including the division-data having the bit error, and correct the bit error based on information on the position of the bit error.

BRIEF DESCRIPTION OF THE DRAWINGS

Example features and advantages of the present invention will become apparent from the following detailed description when taken with the accompanying drawings in which:

FIG. 8 is a diagram showing a part of data which the detection-correction unit in the second example embodiment uses when detecting a position where an error is caused;

FIG. 9 is a diagram showing data which follow the data shown in FIG. 8;

FIG. 10 is a diagram showing data which follow the data shown in FIG. 9;

FIG. 11 is a diagram showing data which follow the data shown in FIG. 10;

FIG. 12 is a diagram showing data which follow the data shown in FIG. 11;

FIG. 13 is a diagram showing data which follow the data shown in FIG. 12;

FIG. 14 is a diagram showing an example of other data which are used when detecting a position where an error is caused;

FIG. 15 is a diagram showing data which follow the data shown in FIG. 14;

FIG. 16 is a diagram showing data which follow the data shown in FIG. 15;

FIG. 17 is a diagram showing an example of other data which are used when detecting a position where an error is caused;

FIG. 18 is a diagram showing data which follow the data shown in FIG. 17;

FIG. 19 is a diagram showing data which follow the data shown in FIG. 18;

FIG. 20 is a diagram showing data which follow the data shown in FIG. 19;

FIG. 21 is a diagram showing data which follow the data shown in FIG. 20;

FIG. 22 is a diagram showing data which follow the data shown in FIG. 21;

FIG. 23 is a diagram showing data which follow the data shown in FIG. 22;

FIG. 24 is a diagram showing data which follow the data shown in FIG. 23;

FIG. 25 is a diagram showing data which follow the data shown in FIG. 24; and

FIG. 26 is a diagram showing data which follow the data shown in FIG. 25.

EXAMPLE EMBODIMENT

Hereinafter, an example embodiment according to the present invention will be explained with reference to drawings.

<First Example Embodiment>

Figure 1:
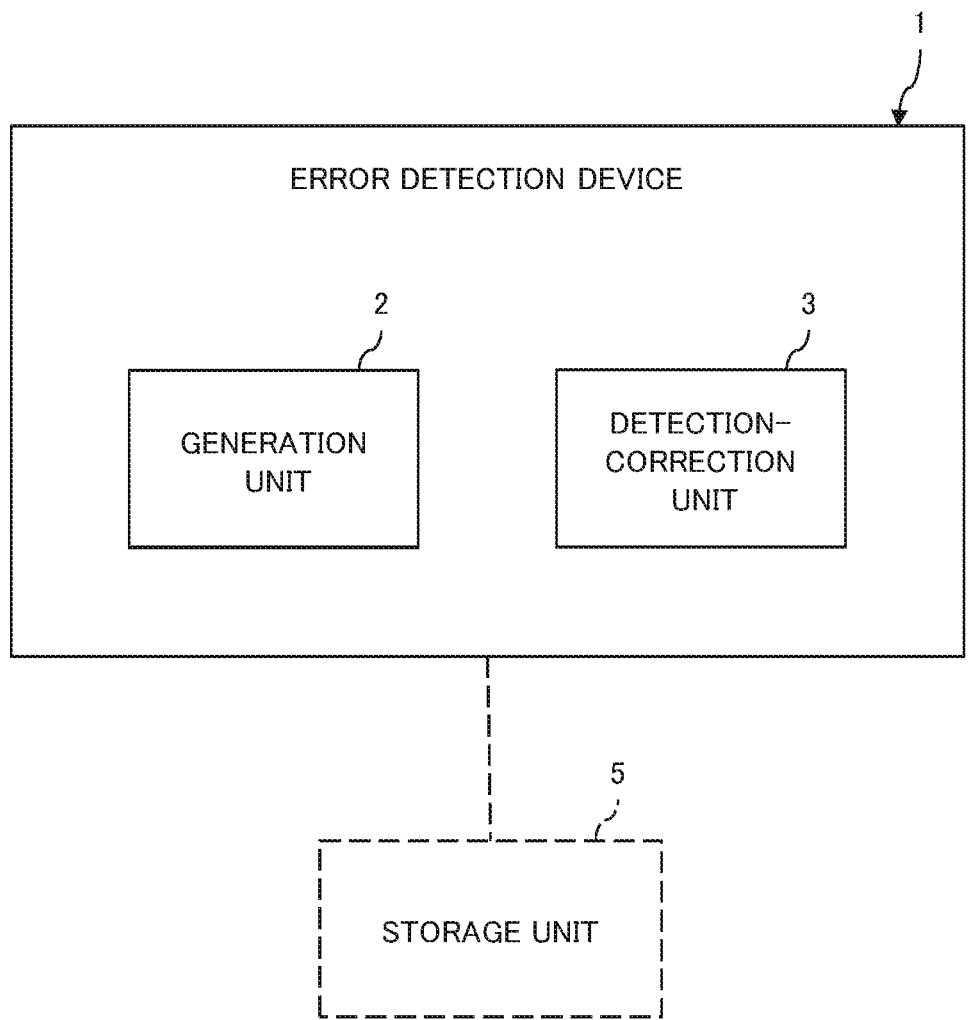
FIG. 1 is a block diagram showing a simplified configuration of an error detection device of a first example embodiment according to the present invention.

FIG. 1 is a block diagram showing a simplified configuration of an error detection device of a first example embodiment according to the present invention. The error detection device 1 of the first example embodiment includes a generation unit 2 and a detection-correction unit 3. The error detection device 1 is connected with a storage unit 5 which stores data including pieces of division-data (that is, the data are divided into pieces of division data) having a read-data size smaller than a write-data size, and the error detection device 1 is an apparatus which is related to error detection of the data in the storage unit 5. The generation unit 2 has a function which, when writing the data into the storage unit 5, generates error detection information on each piece of the division-data composing write-data corresponding to a target data to be written. The error detection information is associated with each piece of division-data. The error detection information is information which is available in determining whether a bit error includes in each piece of the division-data, and which can detect a position where the bit error is caused based on the error detection information which is assigned to each piece of the division-data composing the same write-data.

The detection-correction unit 3 has a function which, when reading the division-data from the storage unit 5, determines whether the bit error is caused in the division-data by using the error detection information associated with the division-data corresponding to read-target data. When the detection-correction unit 3 detects that the bit error is caused, the detection-correction unit 3 acquires pieces of error detection information which are associated with the write-data including the division-data in which it is detected that the bit error is caused. Moreover, the detection-correction unit 3 has a function to detect the position where the bit error is caused, and to correct the bit error by using the pieces of error detection information.

The error detection device 1 of the first example embodiment generates information, by which it is possible to determine whether the bit error is caused in the division-data, as the error detection information which is associated with the division-data composing the write-data and having the read-data size. An information size (data capacity) of the piece of error detection information is smaller than one of information by which it is possible not only to detect that the error is caused, but also to detect the position where the error is caused. Therefore, the error detection device 1 can restrain deterioration in storage density which is caused by using the information for detecting the error of the data stored in the storage unit 5.

Figure 2:
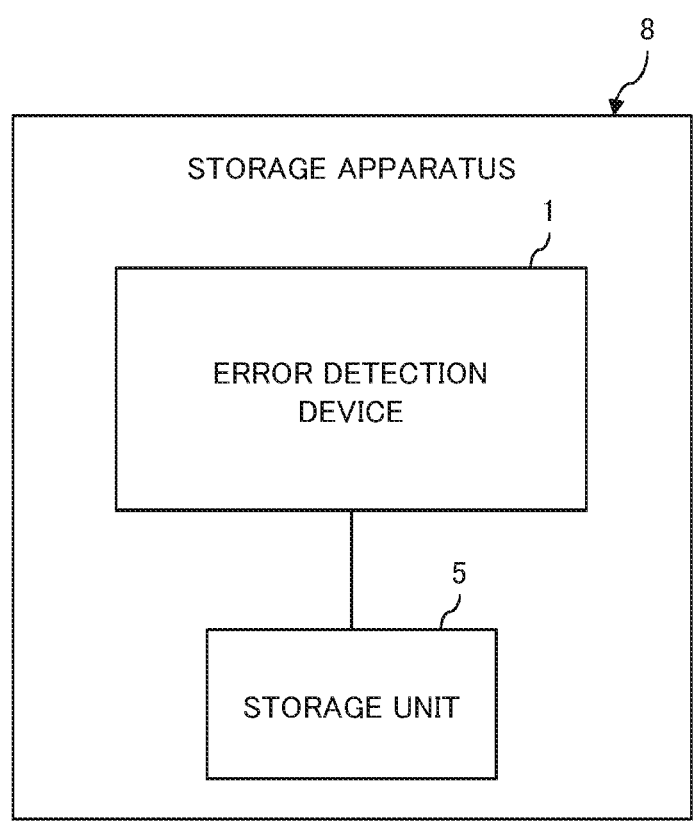
FIG. 2 is a block diagram showing a simplified configuration of a storage apparatus which includes the error detection device of the first example embodiment.

FIG. 2 is a block diagram showing a simplified configuration of a storage apparatus 8 which includes the error detection device 1 of the first example embodiment. The storage apparatus 8 includes the error detection device 1 and the storage unit 5. The storage unit 5 has a function to stores the data including the pieces of division-data each of which has the read-data size smaller than the write-data size. The error detection device 1 of the storage apparatus 8 has the same configuration as the configuration of the error detection device 1 of the first example embodiment mentioned above.

The storage apparatus 8 can acquire the effect that it is possible to restrain deterioration in storage density, which is caused by using the information on detecting the error of the data stored by the storage unit 5, by the storage apparatus 8 including the error detection device 1 of the first example embodiment.

<Second Example Embodiment>

Figure 3:
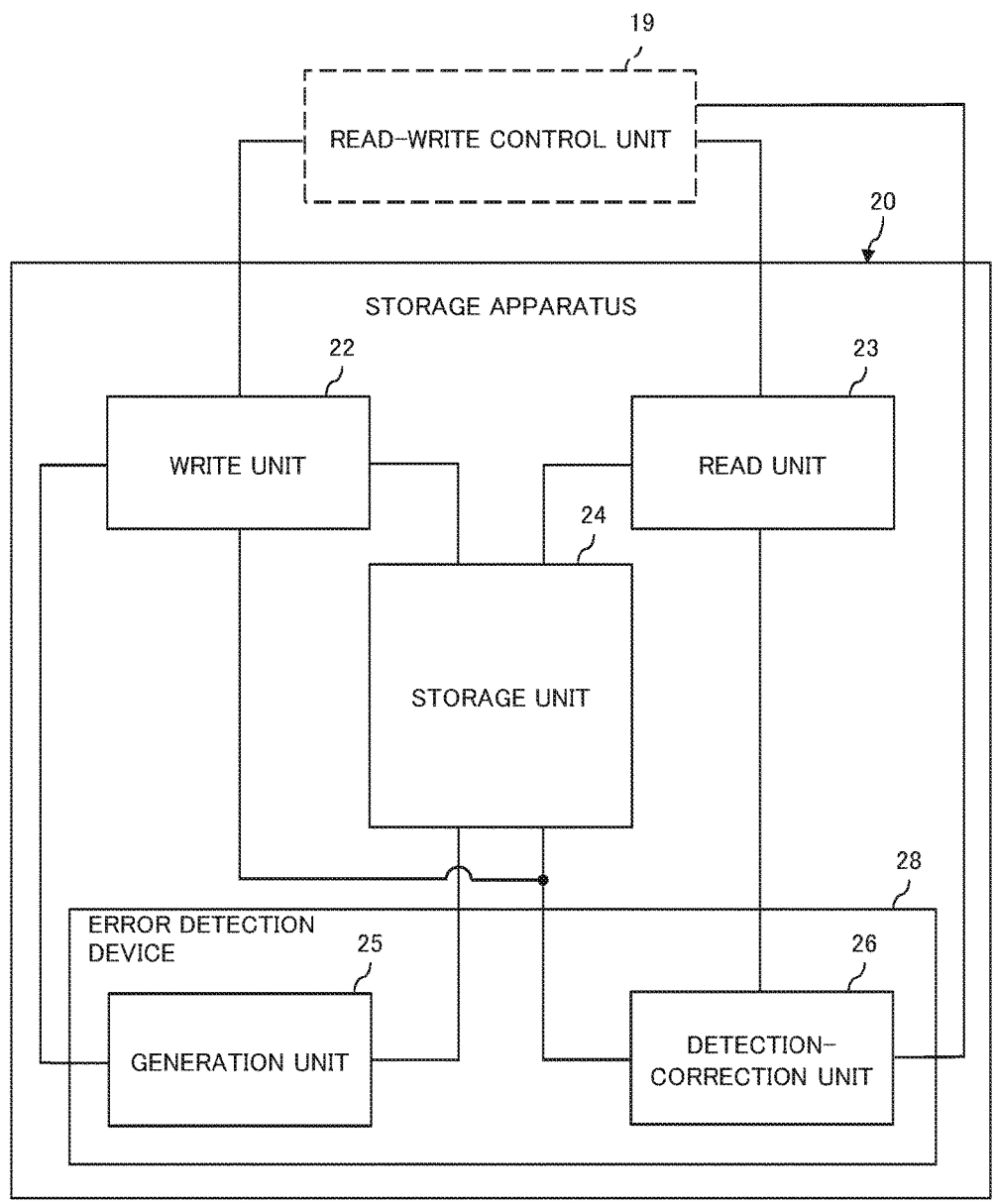
FIG. 3 is a block diagram showing a simplified configuration of a storage apparatus which includes an error detection device of a second example embodiment according to the present invention.

FIG. 3 is a block diagram showing a simplified configuration of a storage apparatus which includes an error detection device of a second example embodiment according to the present invention. A storage apparatus 20 in the second example embodiment is connected with a read-write control unit 19 and reads or writes data in response to an instruction of the read-write control unit 19.

The storage apparatus 20 in the second example embodiment includes a write unit 22, a read unit 23, a storage unit 24, a generation unit 25 and a detection-correction unit 26. Here, the generation unit 25 and the detection-correction unit 26 are included in an error detection device 28.

The above-mentioned components 22 to 26 included in the storage apparatus 20 have the following functions respectively. That is, the write unit 22 is connected with the read-write control unit 19 and receives the following information from the read-write control unit 19. The information received from the read-write control unit 19 in the write unit 22 includes a write-request which requests to write data, data which is data to be written (hereinafter, denoted as write-data in some cases), and a write-address which indicates a position where the storage unit 24 stores the write-data. In the case of the second example embodiment, the write-data is stored by the storage unit 24 in a state that the write-data is divided into a first half (hereinafter, denoted as first half data in some cases) and a second half (hereinafter, denoted as second half data in some cases). Therefore, the write-address includes a write-address assigned to the first half data and a write-address assigned to the second half data.

The write unit 22 has a function which, when receiving the write-request from the read-write control unit 19, outputs the write-request and the write-address received together with the write-request to the storage unit 24. Furthermore, the write unit 22 has a function to output the write-data received together with the write-request to the generation unit 25.

Furthermore, the write unit 22 is connected with the detection-correction unit 26 and receives a correction request, which requests to correct the data stored by the storage unit 24, from the detection-correction unit 26. Furthermore, together with the correction request, the write unit 22 receives data to be corrected and a correction-address indicating a position where the storage unit 24 stores the correction-data, from the detection-correction unit 26. The write unit 22 has a function which, when receiving the correction request from the detection-correction unit 26, outputs the correction request to the storage unit 24. Moreover, the write unit 22 has a function to output the correction-data received together with the correction request, to the generation unit 25, and output the correction-address to the storage unit 24.

Furthermore, the write unit 22 has a function which, when receiving the correction request from the detection-correction unit 26, outputs the correction request to the read-write control unit 19 as a reservation request. The reservation request is information which requests to reserve an instruction issued to the storage apparatus 20 by the read-write control unit 19 until processes of the storage unit 24 and the generation unit 25, which respond to the correction request issued by the detection-correction unit 26, are completed.

Figure 4:
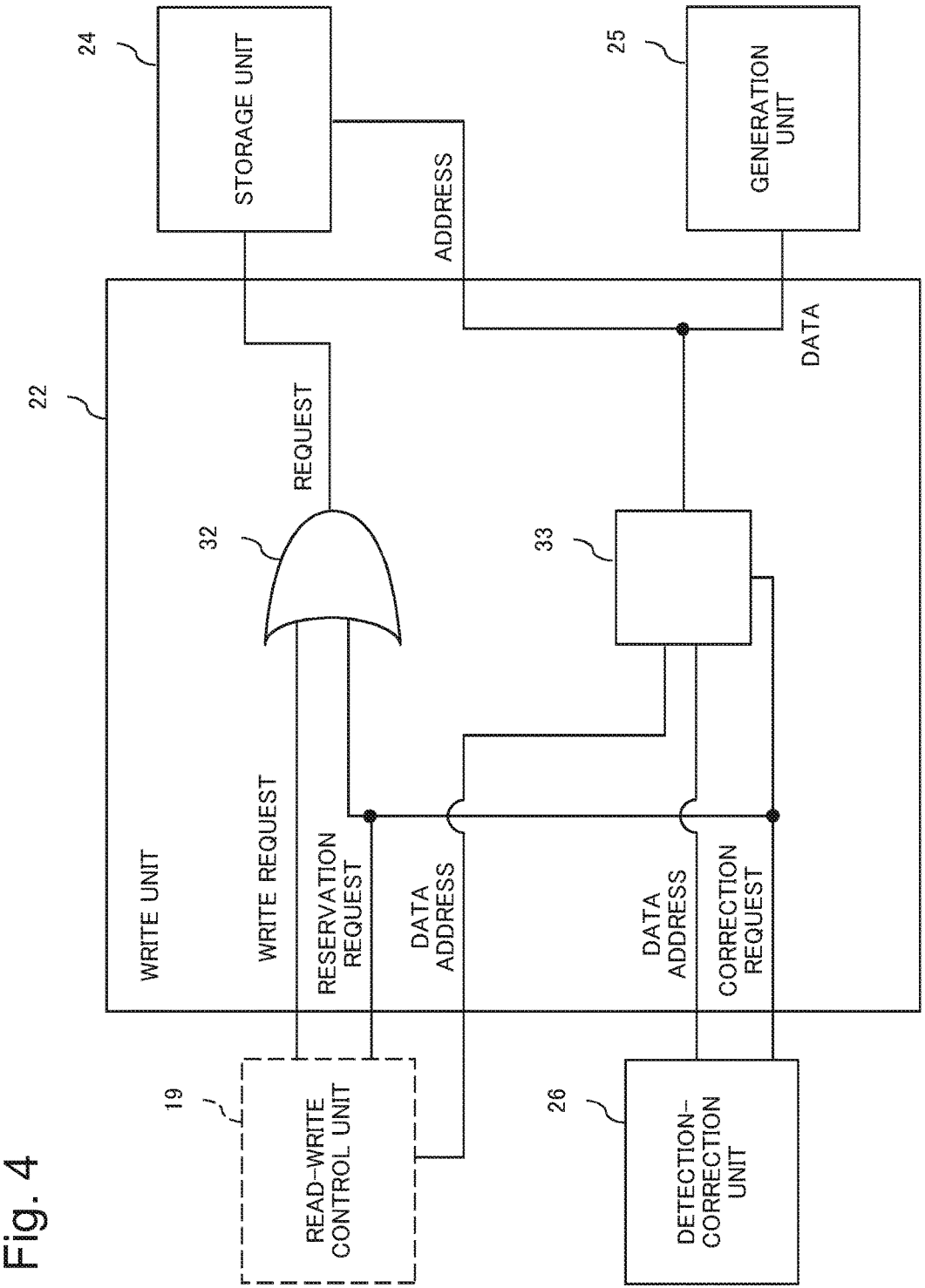
FIG. 4 is a circuit diagram showing an example of a circuit configuration of a write unit in the second example embodiment.

FIG. 4 is a circuit diagram showing an example of a circuit configuration of the write unit 22. The circuit of the write unit 22 shown in FIG. 4 includes a logical sum (OR) circuit 32 and a selection circuit 33. In the circuit shown in FIG. 4, one input port of the OR circuit 32 receives the write request outputted by the read-write control unit 19, and the other input port of the OR circuit 32 receives the correction request outputted by the detection-correction unit 26. An output port of the OR circuit 32 is connected with the storage unit 24. When receiving the write request from the read-write control unit 19, the OR circuit 32 outputs the write request toward the storage unit 24. Moreover, when receiving the correction request from the detection-correction unit 26, the OR circuit 32 outputs the correction request toward the storage unit 24.

One input port of the selection circuit 33 receives the write-data and the write-address from the read-write control unit 19. The other input port of the selection circuit 33 receives the correction-data and the correction-address of the correction-data from the detection-correction unit 26. Moreover, a control signal input port of the selection circuit 33 receives the correction request as a control signal from the detection-correction unit 26. Furthermore, an output port of the selection circuit 33 is connected with the storage unit 24 and the generation unit 25.

When the read-write control unit 19 outputs the write-data and the write-address when the selection circuit 33 does not receive the correction request from the detection-correction unit 26, the selection circuit 33 outputs the write-data and the write-address to the generation unit 26 and the storage unit 24 respectively. On the other hand, when the detection-correction unit 26 outputs the correction request to the selection circuit 33, the selection circuit 33 outputs the correction-data outputted by the detection-correction unit 26 together with the correction request to the generation unit 25 and outputs the correction-address to the storage unit 24.

Moreover, the write unit 22 outputs the correction request outputted by the detection-correction unit 26 toward the read-write control unit 19 as the reservation request.

The generation unit 25 is connected with the write unit 22 and has a function which, when the generation unit 25 receives the write-data or the correction-data from the write unit 22, generates a code (denoted as error detection code in some cases) used for detecting an error of the write-data or the correction-data. In the second example embodiment, the write-data is stored by the storage unit 24 in the state that the write-data is divided into the first half data and the second half data as mentioned above. Therefore, while the generation unit 25 generates the error detection code for the first half data and the error detection code for the second half data, a whole of the write-data is used for generating the error detection codes for the first half data and the second half data.

A specific example of a method for generating the code by the generation unit 25 will be mentioned in the following. Here, it is assumed that data to be written data is data of 64 bits. In this case, the generation unit 25 generates the error detection code of 4 bits for the first half data and the error detection code of 4 bits for the second half data. That is, the generation unit 25 generates the error detection code of 8 bits in total. Here, it is assumed that $P_{[i]}$ (i=0, 1, 2, . . . , 7) represents an i's digit (bit) out of the error detection code of 8 bits. Moreover, it is assumed that $D_{[j]}$ (j=0, 1, 2, . . . , 63) represents a j's digit (bit) out of the write-data of 64-bits.

On calculating $P_{[0]}$ to $P_{[7]}$, the generation unit 25 uses $D_{[j]}$ which is selected out of all of $D_{[j]}$ (j=0, 1, 2, . . . 63) included in the write-data based on a selection rule given beforehand. $D_{[j]}$ is selected so as to satisfy the following condition. That is, when considering a logical calculation of $P_{[0]}\char`\^P_{[1]}\char`\^P_{[2]}\char`\^P_{[3]}$ (mark "^" represents calculation of exclusive OR (EX-OR)), calculation target data of the calculation include bits, whose number is odd, out of each bit of the first half data (($D_{[0]}$ to $D_{[31]}$) of the write-data. Moreover, the calculation target data of the calculation include bits, whose number is even, out of each bit of the second half data (($D_{[32]}$ to $D_{[63]}$) of the write-data. Moreover, when considering a logical calculation of $P_{[4]}\char`\^P_{[5]}\char`\^P_{[6]}\char`\^P_{[7]}$ (mark "^" represents calculation of exclusive OR (EX-OR)), calculation target data of the calculation include bits, whose number is even, out of each bit of the first half data (($D_{[0]}$ to $D_{[31]}$) of the write-data. Moreover, the calculation target data of the calculation include bits, whose number is odd, out of each bit of the second half data (($D_{[32]}$ to $D_{[63]}$) of the write-data.

Here, it is assumed that, when the formulas for calculating $P_{[0]}$ to $P_{[7]}$ are calculated by use of bit values of actual data, values which are acquired by the above-mentioned calculation are denoted as $Q_{[0]}$ to $Q_{[7]}$ respectively. A bit pattern is acquired by calculating EX-OR of each bit $P_{[i]}$ (i=0, 1, 2, . . . , 7) of the error detection code, and each calculated value $Q_{[i]}$ (i=0, 1, 2, . . . , 7), which is corresponding to each bit $P_{[i]}$ (i=0, 1, 2, . . . , 7), such as $P_{[0]}\char`\^Q_{[0]}$, $P_{[1]}\char`\^Q_{[1]}$ and the like. $D_{[j]}$, which is used in the formulas for calculating $P_{[0]}$ to $P_{[7]}$, is selected so as to identify an error position at which one-bit error is caused and which is stored by the storage 24, by use of the acquired bit pattern.

More specifically, the generation unit 25 generates the error detection code according to the calculation formulas (generation formulas) for calculating $P_{[0]}$ to $P_{[7]}$ based on $D_{[j]}$ selected as shown in the following.

$P_{[0]}=P_{[0]\_f}\char`\^P_{[0]\_l}$ $P_{[0]\_f}=D_{[0]}\char`\^D_{[4]}\char`\^D_{[8]}\char`\^D_{[12]}\char`\^D_{[16]}\char`\^D_{[20]}\char`\^D_{[24]}\char`\^D_{[28]}\char`\^D_{[29]}\char`\^D_{[30]}$ $P_{[0]\_l}=D_{[32]}\char`\^D_{[33]}\char`\^D_{[34]}\char`\^D_{[35]}\char`\^D_{[36]}\char`\^D_{[37]}\char`\^D_{[38]}\char`\^D_{[39]}\char`\^D_{[40]}\char`\^D_{[41]}\char`\^D_{[42]}\char`\^D_{[43]}\char`\^D_{[44]}\char`\^D_{[45]}\char`\^D_{[46]}\char`\^D_{[47]}$ $P_{[1]}=P_{[1]\_f}\char`\^P_{[1]\_l}$ $P_{[1]\_f}=D_{[1]}\char`\^D_{[5]}\char`\^D_{[9]}\char`\^D_{[13]}\char`\^D_{[17]}\char`\^D_{[21]}\char`\^D_{[25]}\char`\^D_{[28]}\char`\^D_{[29]}\char`\^D_{[31]}$ $P_{[1]\_l}=D_{[32]}\char`\^D_{[33]}\char`\^D_{[34]}\char`\^D_{[35]}\char`\^D_{[36]}\char`\^D_{[37]}\char`\^D_{[38]}\char`\^D_{[39]}\char`\^D_{[48]}\char`\^D_{[49]}\char`\^D_{[50]}\char`\^D_{[51]}\char`\^D_{[52]}\char`\^D_{[53]}\char`\^D_{[54]}\char`\^D_{[55]}$ $P_{[2]}=P_{[2]\_f}\char`\^P_{[2]\_l}$ $P_{[2]\_f}=D_{[2]}\char`\^D_{[6]}\char`\^D_{[10]}\char`\^D_{[14]}\char`\^D_{[18]}\char`\^D_{[22]}\char`\^D_{[26]}\char`\^D_{[28]}\char`\^D_{[30]}\char`\^D_{[31]}$ $P_{[2]\_l}=D_{[32]}\char`\^D_{[33]}\char`\^D_{[34]}\char`\^D_{[35]}\char`\^D_{[40]}\char`\^D_{[41]}\char`\^D_{[42]}\char`\^D_{[43]}\char`\^D_{[48]}\char`\^D_{[49]}\char`\^D_{[50]}\char`\^D_{[51]}\char`\^D_{[56]}\char`\^D_{[57]}\char`\^D_{[58]}\char`\^D_{[59]}$ $P_{[3]}=P_{[3]\_f}\char`\^P_{[3]\_l}$ $P_{[3]\_f}=D_{[3]}\char`\^D_{[7]}\char`\^D_{[11]}\char`\^D_{[15]}\char`\^D_{[19]}\char`\^D_{[23]}\char`\^D_{[27]}\char`\^D_{[29]}\char`\^D_{[30]}\char`\^D_{[31]}$ $P_{[3]\_l}=D_{[32]}\char`\^D_{[33]}\char`\^D_{[34]}\char`\^D_{[35]}\char`\^D_{[44]}\char`\^D_{[45]}\char`\^D_{[46]}\char`\^D_{[47]}\char`\^D_{[52]}\char`\^D_{[53]}\char`\^D_{[54]}\char`\^D_{[55]}\char`\^D_{[56]}\char`\^D_{[57]}\char`\^D_{[58]}\char`\^D_{[59]}$ $P_{[4]}=P_{[4]\_f}\char`\^P_{[4]\_l}$ $P_{[4]\_f}=D_{[0]}\char`\^D_{[1]}\char`\^D_{[2]}\char`\^D_{[3]}\char`\^D_{[4]}\char`\^D_{[5]}\char`\^D_{[6]}\char`\^D_{[7]}\char`\^D_{[8]}\char`\^D_{[9]}\char`\^D_{[10]}\char`\^D_{[11]}\char`\^D_{[12]}\char`\^D_{[13]}\char`\^D_{[14]}\char`\^D_{[15]}$ $P_{[4]\_l}=D_{[32]}\char`\^D_{[36]}\char`\^D_{[40]}\char`\^D_{[44]}\char`\^D_{[48]}\char`\^D_{[52]}\char`\^D_{[56]}\char`\^D_{[60]}\char`\^D_{[61]}\char`\^D_{[62]}$ $P_{[4]}=P_{[4]\_f}\char`\^P_{[4]\_l}$ $P_{[4]\_f}=D_{[0]}\char`\^D_{[1]}\char`\^D_{[2]}\char`\^D_{[3]}\char`\^D_{[4]}\char`\^D_{[5]}\char`\^D_{[6]}\char`\^D_{[7]}\char`\^D_{[16]}\char`\^D_{[17]}\char`\^D_{[18]}\char`\^D_{[19]}\char`\^D_{[20]}\char`\^D_{[21]}\char`\^D_{[22]}\char`\^D_{[23]}$ $P_{[5]\_l}=D_{[33]}\char`\^D_{[37]}\char`\^D_{[41]}\char`\^D_{[45]}\char`\^D_{[49]}\char`\^D_{[53]}\char`\^D_{[57]}\char`\^D_{[60]}\char`\^D_{[61]}\char`\^D_{[63]}$ $P_{[6]}=P_{[6]\_f}\char`\^P_{[6]\_l}$ $P_{[6]\_f}=D_{[0]}\char`\^D_{[1]}\char`\^D_{[2]}\char`\^D_{[3]}\char`\^D_{[8]}\char`\^D_{[9]}\char`\^D_{[10]}\char`\^D_{[11]}\char`\^D_{[16]}\char`\^D_{[17]}\char`\^D_{[18]}\char`\^D_{[19]}\char`\^D_{[24]}\char`\^D_{[25]}\char`\^D_{[26]}\char`\^D_{[27]}$ $P_{[6]\_l}=D_{[34]}\char`\^D_{[38]}\char`\^D_{[42]}\char`\^D_{[46]}\char`\^D_{[50]}\char`\^D_{[54]}\char`\^D_{[58]}\char`\^D_{[60]}\char`\^D_{[62]}\char`\^D_{[63]}$ $P_{[7]}=P_{[7]\_f}\char`\^P_{[7]\_l}$ $P_{[7]\_f}=D_{[0]}\char`\^D_{[1]}\char`\^D_{[2]}\char`\^D_{[3]}\char`\^D_{[12]}\char`\^D_{[13]}\char`\^D_{[17]}\char`\^D_{[15]}\char`\^D_{[20]}\char`\^D_{[21]}\char`\^D_{[22]}\char`\^D_{[23]}\char`\^D_{[24]}\char`\^D_{[25]}\char`\^D_{[26]}\char`\^D_{[27]}$ $P_{[7]\_l}=D_{[34]}\char`\^D_{[38]}\char`\^D_{[42]}\char`\^D_{[46]}\char`\^D_{[50]}\char`\^D_{[54]}\char`\^D_{[58]}\char`\^D_{[60]}\char`\^D_{[62]}\char`\^D_{[63]}$ The read unit 23 is connected with the read-write control unit 19 and has a function to receive the following information from the read-write control unit 19. The information received from the read-write control unit 19 includes a read request which requests to read data and a read-address which indicates a position where the storage unit 24 stores data to be read data (hereinafter, denoted as read-data in some cases). In the case of the second example embodiment, the write-data is stored by the storage unit 24 in the state that the write-data is divided into the first half data and the second half data as mentioned above. Therefore, the read-address includes two kinds of address, that is, one is a read-address which indicates a position where the first half data is stored, and the other is a read-address which indicates a position where the second half data is stored. In the following explanation, there are two cases regarding denotation of the address, that is, one case is that the first half read-address and the send half read-address are denoted as separated addresses, and the other case is that the read-address is denoted as a collective address. Similarly, the read request includes two kinds of read request, that is, one is a first-half read request and the other is a second half read request. In the following explanation, there are two cases regarding denotation of the read request, that is, one case is that the first half read request and the send half read request are denoted as separated read requests, and the other case is that the read request is denoted as a collective read request.

Furthermore, the read unit 23 is connected with the detection-correction unit 26 and receives the correction request which indicates that it is necessary to correct the data stored by the storage unit 24 and the correction-address which indicates a position where the storage unit 24 stores the correction-data from the detection-correction unit 26. In the case of the second example embodiment, there are two kinds of correction request, that is, one is a first half correction request which indicates that it is necessary to correct the first half data, and the other is a second half correction request which indicates that it is necessary to correct the second half data. In the following explanation, there are two cases regarding denotation of the correction request, that is, one case is that the first half correction request and the second half correction request are denoted as separated correction requests, and the other case is that the read request is denoted as a collective read request. Similarly, the correction-address includes a first half correction-address and a second half correction-address. In the following explanation, there are two cases regarding denotation of the correction-address, that is, one case is that the first half correction-address and the second half correction-address are denoted as separated correction-addresses, and the other case is that the correction-address is denoted as a collective correction-address.

Furthermore, the read unit 23 has a function which, when the read unit 23 receives the read request from the read-write control unit 19 in a state of receiving no correction request, outputs the read request toward the storage unit 24. Furthermore, the read unit 23 has a function to output also the read-address toward the storage unit 24 in this case.

Furthermore, the read unit 23 has a function which, when the read unit 23 receives the correction request, outputs the correction request as the reservation request toward the read-write control unit 19. The read-write control unit 19 which receives the reservation request reserves the operation. Moreover, the read unit 23 has a function which, when receiving the correction request, outputs the correction-address toward the storage unit 24.

Figure 5:
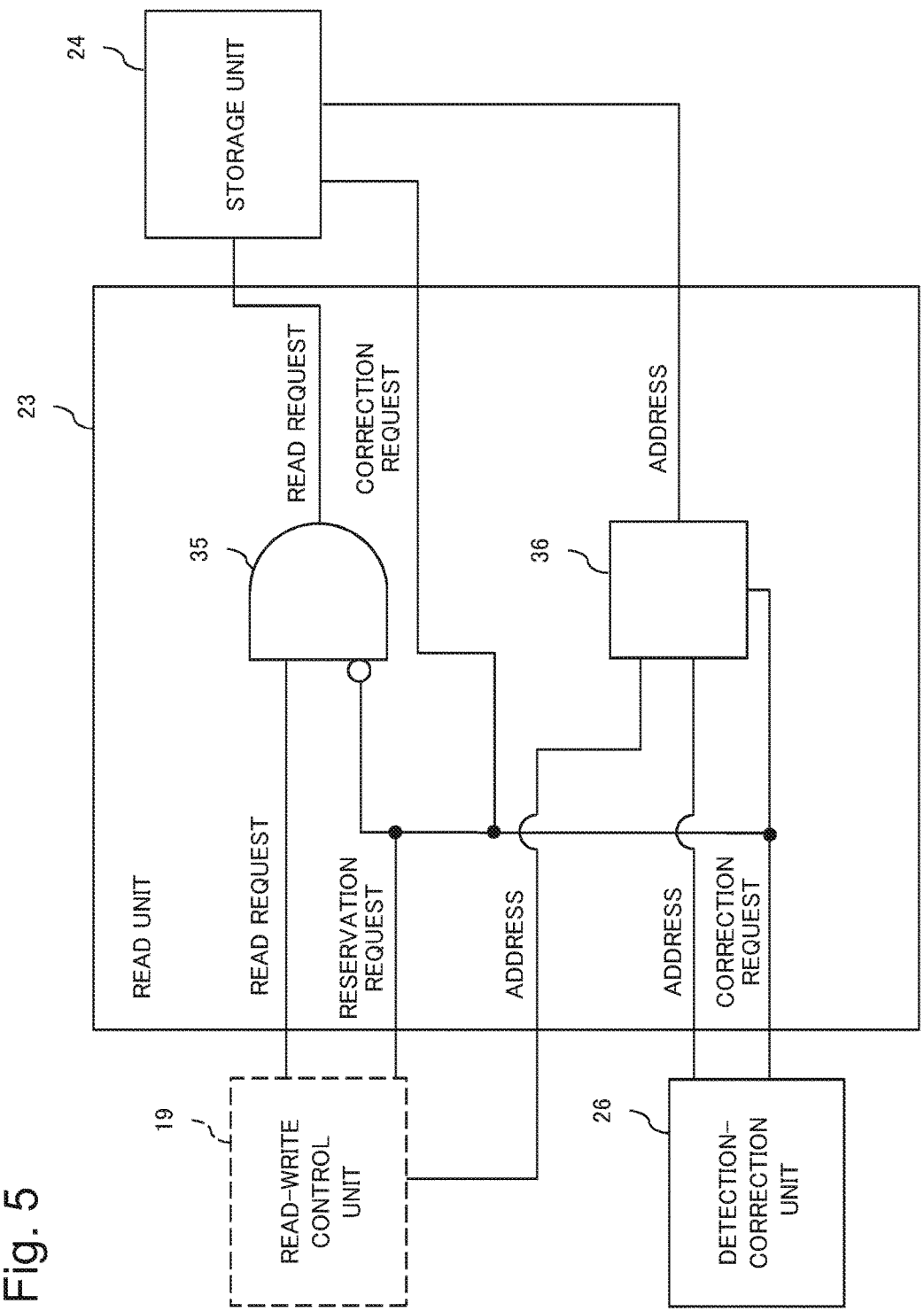
FIG. 5 is a circuit diagram showing an example of a circuit configuration of a read unit in the second example embodiment.

FIG. 5 is a circuit diagram showing an example of a circuit configuration of the read unit 23. A circuit of the read unit 23 shown in FIG. 5 includes a logical product (AND) circuit 35 and a selection circuit 36. In the circuit shown in FIG. 5, one input port of the AND circuit 35 receives the read request which is outputted by the read-write control unit 19. An inversion input port which is another input port of the AND circuit 35 receives the correction request outputted by the detection-correction unit 26. An output port of the AND circuit 35 is connected with the storage unit 24. When the AND circuit 35 receives the read request from the read-write control unit 19 in a state of receiving no correction request from the detection-correction unit 26, the AND circuit 35 outputs the read request toward the storage unit 24 as it is. On the other hand, when the AND circuit 35 receives the correction request from the detection-correction unit 26, the AND circuit 35 does not output any signal, and the correction request is outputted by the read unit 23 toward the read-write control unit 19 as the reservation request. Moreover, the correction request is outputted also to the storage unit 24 by the read unit 23.

One input port of the selection circuit 36 receives the read-address from the read-write control unit 19. The other input port of the selection circuit 36 receives the correction-address from the detection-correction unit 26. Moreover, a control input port of the selection circuit 36 receives the correction request as the control signal from the detection-correction unit 26. Furthermore, an output port of the selection circuit 36 is connected with the storage unit 24.

When the control input port of the selection circuit 36 does not receive the correction request from the detection-correction unit 26, the selection circuit 36 outputs the read-address outputted by the read-write control unit 19 toward the storage unit 24. On the other hand, when the selection circuit 36 receives the correction request from the detection-correction unit 26, the selection circuit 36 outputs the correction-address outputted by the detection-correction unit 26 toward the storage unit 24.

The storage unit 24 has a function which, when the storage unit 24 receives the write request from the write unit 22, stores the write-data and the error detection code received from the generation unit 25 in a state of being associated each other based on the write-address supplied by the write unit 22.

Moreover, the storage unit 24 has a function which, when the storage unit 24 receives the read request and the read-address from the read unit 23, reads the read-data based on the read-address and outputs the read-data to the detection-correction unit 26.

Furthermore, the storage unit 24 has a function to receive the correction request and the correction-address outputted by the detection-correction unit 26 through the read unit 23, and read the correction-data based on the correction-address, and output the correction-data to the detection-correction unit 26.

Figure 6:
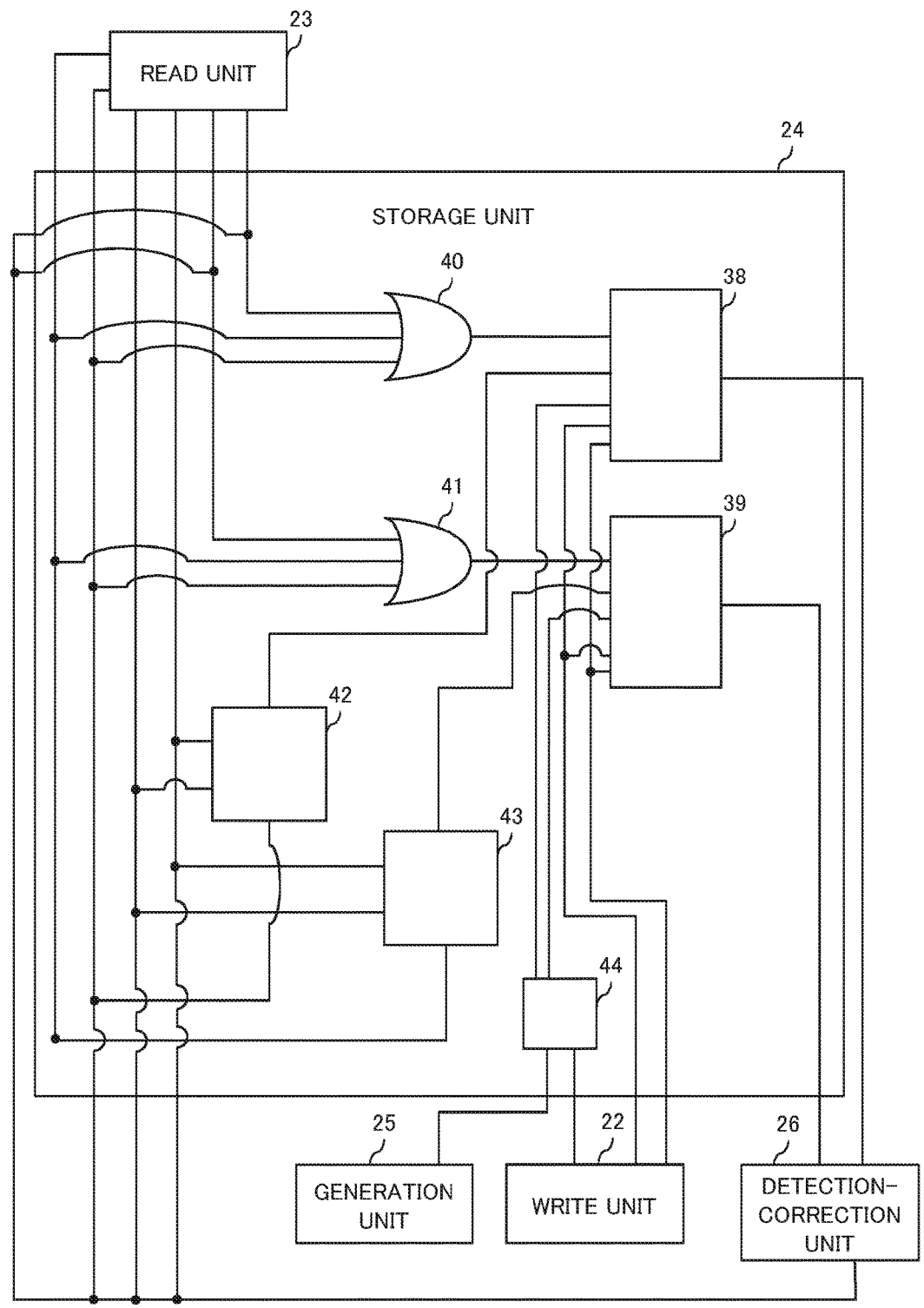
FIG. 6 is a circuit diagram showing an example of a circuit configuration of a storage unit in the second example embodiment.

FIG. 6 is a circuit diagram showing an example of a circuit configuration of the storage unit 24. The storage unit 24 shown in FIG. 6 includes a first half storage unit 38, a second half storage unit 39, logical sum (OR) circuits 40 and 41, selection circuits 42 and 43 and a distribution circuit 44.

When the exemplified circuit, a first half write request applied to the storage unit 24 by the write unit 22 is supplied to the first half storage unit 38 as a write permission. Moreover, a second half write request applied to the storage unit 24 by the write unit 22 is supplied to the second half storage unit 39 as the write permission. Furthermore, the write-address applied to the storage unit 24 by the write unit 22 is supplied to the first half storage unit 38 and the second half storage unit 39.

The write-data are applied to the distribution circuit 44 by the write unit 22. Moreover, the error detection code related to the write-data is applied to the distribution circuit 44 by the generation unit 25. The distribution circuit 44 divides the write-data into the first half data and the second half data, and divides the error detection code into the error detection code for the first half data and the error detection code for the second half data. The distribution circuit 44 outputs the first half data and the error detection code for the first half data to the first half storage unit 38, and outputs the second half data and the error detection code for the second half data to the second half storage unit 39.

When the first half storage unit 38 receives the first half data and the error detection code for the first half data in a state of receiving the write permission from the write unit 22 based on the write-address provided by the write unit 22, the first half storage unit 38 stores the first half data and the error detection code for the first half data in a state that the first half data and the error detection code for the first half data are associated each other. Moreover, when the second half storage unit 39 receives the second half data and the error detection code for the second half data in a state of receiving the read permission from the OR circuit 41 based on the write-address provided by the write unit 22, the second half storage unit 39 stores the second half data and the error detection code for the second half data in a state that the second half data and the error detection code for the second half data are associated each other.

In the case of the exemplified example, the storage unit 24 connected with the read unit 23 receives the read request, the correction request, the read-address and the correction-address outputted by the read unit 23, and outputs the received requests and the received addresses to the detection-correction unit 26.

When receiving any one of the first half read request, the first half correction request and the second half correction request outputted by the read unit 23, the OR circuit 40 outputs the read admission toward the first half storage unit 38. Moreover, when receiving any one of the second half read request, the first half correction request and the second half correction request outputted by the read unit 23, the OR circuit 41 outputs the read admission toward the second half storage unit 39.

The first half read-address and the second half read-address are applied to the selection circuit 42 by the read unit 23. Moreover, the second half correction request is applied to the selection circuit 42 by the read unit 23 as the control signal. When the second half correction request which is the control signal is applied to the selection circuit 42, the selection circuit 42 outputs the first half read-address and the second half read-address toward the first half storage unit 38. On the other hand, when the second half correction request is not applied to the selection circuit 42, the selection circuit 42 outputs the first half read-address toward the first half storage unit 38.

The first half read-address and the second half read-address are applied to the selection circuit 43 by the read unit 23. Moreover, the first half correction request is applied to the selection circuit 43 by the read unit 23 as the control signal. When the first half correction request of being the control signal is applied to the selection circuit 43, the selection circuit 43 outputs the first half read-address and the second half read-address toward the second half storage unit 39. On the other hand, when the second half correction request is not applied to the selection circuit 43, the selection circuit 43 outputs the second half read-address toward the second half storage unit 39.

The first half storage unit 38 receives the first half read-address in a state of receiving the read permission from the OR circuit 40. The first half storage unit 38 reads the first half data together with the error detection code for the first half data based on the first half read-address and outputs the data read to the detection-correction unit 26. Moreover, the second half storage unit 39 receives the second half read-address in a state of receiving the read permission from the OR circuit 41 and reads the second half data together with the error detection code for the second half data based on the second half read-address, and outputs the data read to the detection-correction unit 26.

Figure 7:
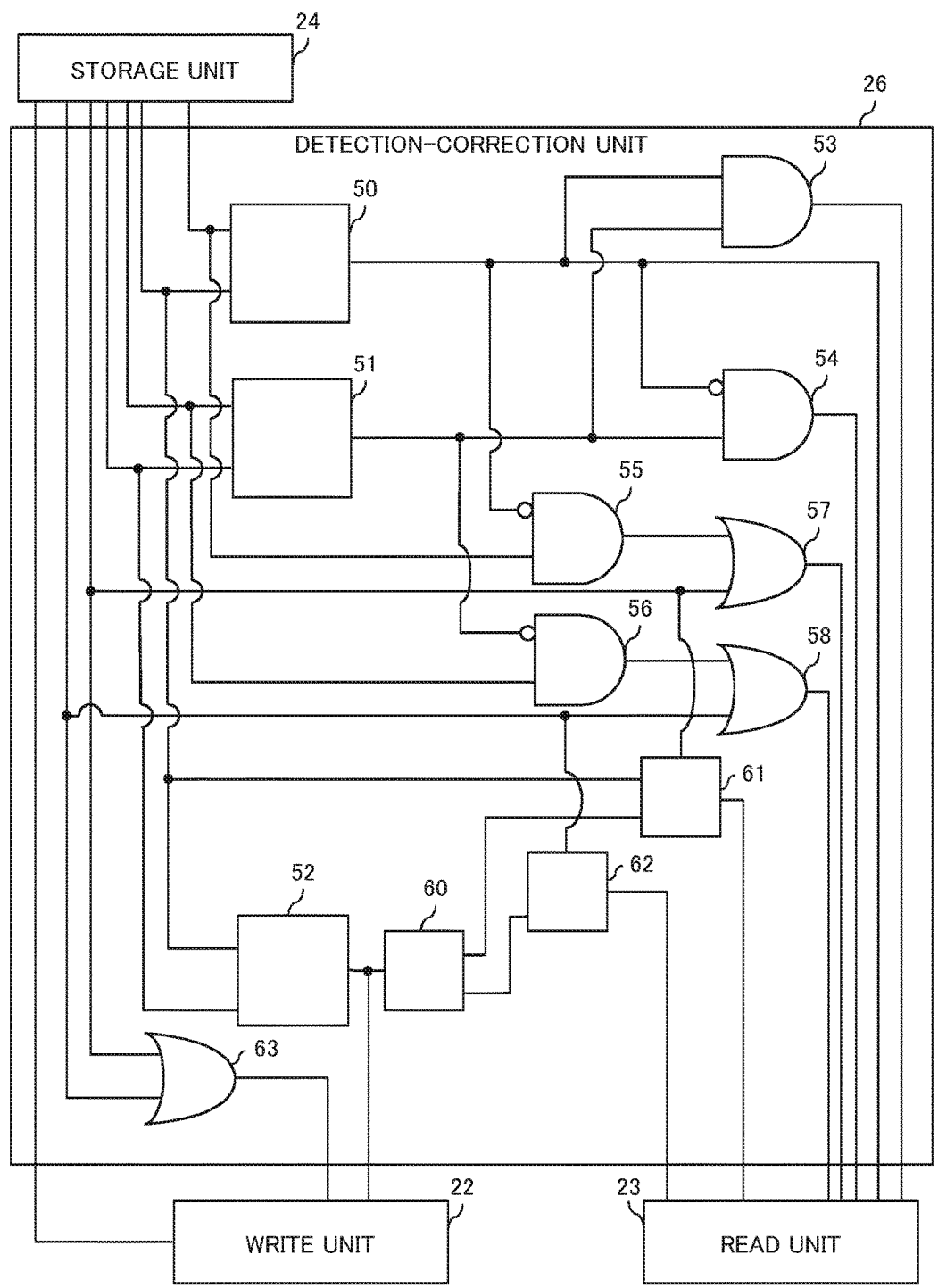
FIG. 7 is a circuit diagram showing an example of a circuit configuration of a detection-correction unit in the second example embodiment.

The detection-correction unit 26 has a function which, when receiving the read-data and the read-information from the storage unit 24, detects the bit error that is caused in the read-data, and has a function to correct the bit error when detecting the bit error. Furthermore, the detection-correction unit 26 has a function to notify the read-write control unit 19 of a re-try request when the error is caused in each of the first half data and the second half data. FIG. 7 is a circuit diagram showing an example of a circuit configuration of the detection-correction unit 26. The circuit of the detection-correction unit 26 shown in FIG. 7 includes detection circuits 50 and 51, a correction circuit 52, AND circuits 53, 54, 55 and 56, OR circuits 57 and 58, a distribution circuit 60, selection circuits 61 and 62, and an OR circuit 63.

The detection circuit 50 is connected with the storage unit 24 and receives the first half read request, the first half data, and the error detection code for the first half data from the storage unit 24. When the detection circuit 50 receives the first read request and receives the first half data and the error detection code for the first half data, the detection circuit 50 determines whether the error is caused in the first half data. Specifically, for example, the detection circuit 50 calculates EX-OR of the first half data (32 bits: $D_{[0]}$ to $D_{[31]}$) and the error detection code for the first half data (4 bits: $P_{[0]}$ to $P_{[3]}$) received. When a calculated value is "1", the detection circuit 50 outputs information representing that the error is caused in the first half data read. The information is outputted toward the read unit 23 as the first half correction request and is supplied to the AND circuits 53, 54 and 55. On the other hand, when the calculated value is "0", the detection circuit 50 outputs information representing that the error is not caused in the first half data read.

The detection circuit 51 receives the second half read request, the second half data, and the error detection code for the second half data from the storage unit 24. When the detection circuit 51 receives the second half read request, the second half data and the error detection code for the second half data, the detection circuit 51 determines whether the error is caused in the second half data. Specifically, for example, the detection circuit 51 calculates EX-OR of the second half data (32 bits: $D_{[32]}$ to $D_{[63]}$) and the error detection code for the second half data (4 bits: $P_{[4]}$ to $P_7$) received. When a calculated value is "1", the detection circuit 51 outputs information representing that the error is caused in the second half data read. The information is supplied to the AND circuits 53, 54 and 56. On the other hand, when the calculated value is "0", the detection circuit 51 outputs information representing that the error is not caused in the second half data read.

The AND circuit 53 receives pieces of information outputted by the detection circuits 50 and 51. In the detection operation, when the detection circuits 50 and 51 detect that the error is caused in each of the first half data and the second half data, the AND circuit 53 outputs the re-try request, which requests to read the data again, toward the read-write control unit 19. After the reservation request is released, the read-write control unit 19 outputs the re-try request and a re-try-address as the read request and the read-address respectively to the read unit 23.

Moreover, the AND circuit 54 receives the pieces of information outputted by the detection circuits 50 and 51. In the detection operation, when the detection circuits 50 and 51 detect that the error is not caused in the first half data and the error is caused in the second half data, the AND circuit 54 outputs the second half correction request toward the read unit 23.

Furthermore, the AND circuit 55 receives the information outputted by the detection 50 and the first half read request. In the detection operation, when the detection circuit 50 detects that the error is not caused in the first half data, the AND circuit 55 outputs the first half read request as first-half-read effectiveness notice through the OR circuit 57.

Furthermore, the AND circuit 56 receives the information outputted by the detection 51 and the second half read request. In the detection operation, when the detection circuit 51 detects that the error is not caused in the second half data, the AND circuit 56 outputs the second half read request as second-half-read effectiveness notice through the OR circuit 58.

The first half data and the error detection code for the first half data outputted by the storage unit 24 are applied to the correction circuit 52. Moreover, the second half data and the error detection code for the second half data outputted by the storage unit 24 are applied to the correction circuit 52. That is, in the above-mentioned detection operation, when the detection circuits 50 and 51 detect that the error is caused in the first half data or in the second half data, the correction request is outputted to the storage unit 24 through the read unit 23. In this case, the first half data, the second half data, and the error detection code are read by the storage unit 24, and are applied to the correction circuit 52. The correction circuit 52 has a function which, when receiving the first half data, the second half data and the error detection code, detects the position where the error is caused by use of the above-mentioned formulas (generation formulas) which are used when calculating the error detection code, the data read, and the error detection code. That is, the correction circuit 52 calculates EX-OR of the calculated values $Q_{[0]}$ to $Q_{[7]}$ acquired by applying each bit of the data read to the calculation formulas (generation formulas) and the error detection code $P_{[0]}$ to $P_{[7]}$ read. As a result, the calculated values $E_{[0]}$ to $E_{[7]}$ are acquired. Then, the correction circuit 52 compares the bit pattern, which is composed of the calculated values $E_{[0]}$ to $E_{[7]}$, with error position detection data shown in FIG. 8 to FIG. 13 given in advance, and then detects the bit position where the error is caused. Furthermore, the correction circuit 52 inverts a logical value of the bit position where the error is detected, and outputs the data (correction-data), which has been corrected, to the write unit 22. By receiving the correction-data in the state of having received the correction request and the correction-address, the write unit 22 writes the correction-data at a storage position which is based on the correction-address. That is, the write unit 22 corrects the data of the storage unit 24.

The distribution circuit 60 divides the data, which has been corrected, into first half data and second half data, and then outputs the first half data and the second half data to the selection circuit 61 and the selection circuit 62 respectively.

The first half data read by the read unit 23 are applied to the selection circuit 61, and the first half data corrected by the correction circuit 52 are applied to the selection circuit 61 through the distribution circuit 60. Moreover, the correction request is applied to the selection circuit 61 by the storage unit 24 as the control signal. When the correction request is applied to the selection circuit 61, the selection circuit 61 outputs the corrected first half data as the read-data. On the other hand, when the correction request is not applied to the selection circuit 61, the selection circuit 61 outputs the first half data read by the read unit 23 as it is.

The second half data read by the read unit 23 are applied to the selection circuit 62, and the second half data corrected by the correction circuit 52 are applied to the selection circuit 62 through the distribution circuit 60. Moreover, the correction request read from the storage unit 24 is applied to the selection circuit 61 as the control signal. When the correction request is applied to the selection circuit 61, the selection circuit 61 outputs the corrected second half data as the read-data. On the other hand, when the correction request is not applied to the selection circuit 61, the selection circuit 61 outputs the second half data read by the read unit 23 as it is.

When the first half correction request or the second half correction request read from the storage unit 24 is applied to the OR circuit 63, the OR circuit 63 outputs the applied request to the write unit 23 as the correction request (correction write request).

As mentioned above, the detection-correction unit 26 detects the error of data read by the read unit 23, and outputs the read-data, in which the error is not caused, toward the read-write control unit 19 through the read unit 23 as it is. Moreover, when the detection-correction unit 26 detects one-bit error by detecting the error in the read-data, the detection-correction unit 26 corrects the one-bit error, and outputs the corrected read-data toward the read-write control unit 19 through the read unit 23. Furthermore, the detection-correction unit 26 corrects the erroneous data stored by the storage unit 24.

The error detection device 28 according to the second example embodiment and the storage apparatus 20 including the error detection device 28 have the above-mentioned configuration. When reading the first half data or the second half data by use of the error detection code associated with the first half data or the second half data to be read, the storage apparatus 20 of the second example embodiment determines whether one-bit error is caused in the first half data or the second half data. When the storage apparatus 20 determines that the error is caused in the first half data or the second half data, the storage apparatus 20 detects the bit position where the error is caused by use of not any one but both of the error detection codes for the first half data and the second half data. Then, the storage apparatus 20 corrects the read-data by correcting a bit including at the detected bit position, and outputs the corrected read-data.

By the storage apparatus 20 having the above-mentioned configuration, the error detection codes associated with the first half data and the second half data respectively may be a code by which it is possible to determine whether the error is caused in the first half data or the second half data. Therefore, it is possible to reduce number of bits of the error detection code for the first half data and the error detection code for the second half data in comparison with a code using for detecting not only occurrence of the error but also the position where the error is occurred.

By virtue of the above mention, the storage apparatus 20 can obtain an effect that it is possible to restrain deterioration in storage density which is caused by using the error detection code when the read-data size and the write-data size are different each other.

<Another Example Embodiment>

Here, the present invention is not limited to the first and the second example embodiments and can adopt various example embodiments. While it is exemplified in the second example embodiment that the size of the write-data is 64 bits, the present invention can be applied to a storage apparatus or an error detection device in which write-data have another size.

When the size of the write-data is, for example, 32 bits, error detection codes of 4 bits are associated with a first half data (16 bits) and a second half data (16 bits) respectively. An error detection code $P_{[0]}$ to $P_{[7]}$ is calculated by the following calculation formulas (generation formulas).

$$P_{[0]} = P_{[0]\_f} \char`\^ P_{[0]\_l}$$

$$P_{[0]\_f} = D_{[0]} \char`\^ D_{[4]} \char`\^ D_{[8]} \char`\^ D_{[12]} \char`\^$$

$$P_{[0]\_l} = D_{[16]} \char`\^ D_{[17]} \char`\^ D_{[18]} \char`\^ D_{[19]} \char`\^ D_{[20]} \char`\^ D_{[21]} \char`\^ D_{[22]} \char`\^ D_{[23]} \char`\^ D_{[24]} \char`\^ D_{[25]} \char`\^ D_{[26]} \char`\^ D_{[27]} \char`\^ D_{[28]} \char`\^ D_{[29]} \char`\^ D_{[30]} \char`\^ D_{[31]}$$

$$P_{[1]} = P_{[1]\_f} \char`\^ P_{[1]\_l}$$

$$P_{[1]\_f} = D_{[1]} \char`\^ D_{[5]} \char`\^ D_{[9]} \char`\^ D_{[13]}$$

$$P_{[1]\_l} = D_{[16]} \char`\^ D_{[17]} \char`\^ D_{[18]} \char`\^ D_{[19]} \char`\^ D_{[20]} \char`\^ D_{[21]} \char`\^ D_{[22]} \char`\^ D_{[23]}$$

$$P_{[2]} = P_{[2]\_f} \char`\^ P_{[2]\_l}$$

$P_{[2]\_f} = D_{[2]} \hat{} D_{[6]} \hat{} D_{[10]} \hat{} D_{[14]}$ $P_{[2]\_i} = D_{[16]} \hat{} D_{[17]} \hat{} D_{[18]} \hat{} D_{[19]} \hat{} D_{[24]} \hat{} D_{[25]} \hat{} D_{[26]} \hat{} D_{[27]}$ $P_{[3]} = P_{[3]\_f} \hat{} P_{[3]\_i}$ $P_{[3]\_f} = D_{[3]} \hat{} D_{[7]} \hat{} D_{[11]} \hat{} D_{[15]}$ $P_{[3]\_i} = D_{[16]} \hat{} D_{[17]} \hat{} D_{[18]} \hat{} D_{[19]} \hat{} D_{[28]} \hat{} D_{[29]} \hat{} D_{[30]} \hat{} D_{[31]}$ $P_{[4]} = P_{[4]\_f} \hat{} P_{[4]\_i}$ $P_{[4]\_f} = D_{[0]} \hat{} D_{[1]} \hat{} D_{[2]} \hat{} D_{[3]} \hat{} D_{[4]} \hat{} D_{[5]} \hat{} D_{[6]} \hat{} D_{[7]} \hat{} D_{[8]} \hat{} D_{[9]} \hat{} D_{[10]} \hat{} D_{[11]} \hat{} D_{[12]} \hat{} D_{[13]} \hat{} D_{[14]} \hat{} D_{[15]}$ $P_{[4]\_i} = D_{[16]} \hat{} D_{[20]} \hat{} D_{[24]} \hat{} D_{[28]}$ $P_{[5]} = P_{[5]\_f} \hat{} P_{[5]\_i}$ $P_{[5]\_f} = D_{[0]} \hat{} D_{[1]} \hat{} D_{[2]} \hat{} D_{[3]} \hat{} D_{[4]} \hat{} D_{[5]} \hat{} D_{[6]} \hat{} D_{[7]}$ $P_{[5]\_i} = D_{[17]} \hat{} D_{[21]} \hat{} D_{[25]} \hat{} D_{[29]}$ $P_{[6]} = P_{[6]\_f} \hat{} P_{[6]\_i}$ $P_{[6]\_f} = D_{[0]} \hat{} D_{[1]} \hat{} D_{[2]} \hat{} D_{[3]} \hat{} D_{[8]} \hat{} D_{[9]} \hat{} D_{[10]} \hat{} D_{[11]}$ $P_{[6]\_i} = D_{[18]} \hat{} D_{[22]} \hat{} D_{[26]} \hat{} D_{[30]}$ $P_{[7]} = P_{[7]\_f} \hat{} P_{[7]\_i}$ $P_{[7]\_f} = D_{[0]} \hat{} D_{[1]} \hat{} D_{[2]} \hat{} D_{[3]} \hat{} D_{[12]} \hat{} D_{[13]} \hat{} D_{[17]} \hat{} D_{[15]}$ $P_{[7]\_i} = D_{[19]} \hat{} D_{[23]} \hat{} D_{[27]} \hat{} D_{[31]}$ $D_{[j]}$ (j=0, 1, 2, . . . , 31) which form the calculation formulas for calculating the above-mentioned code $P_{[0]}$ to $P_{[7]}$ satisfy the following condition. That is, when considering a logical calculation of $P_{[0]} \hat{} P_{[1]} \hat{} P_{[2]} \hat{} P_{[3]}$ (mark "$\hat{}$" represents calculation of exclusive OR (EX-OR)), calculation target data of the calculation include bits, whose number is odd, out of each bit of the first half data ($D_{[0]}$ to $D_{[15]}$). Furthermore, the calculation target data of the calculation include bits, whose number is even, out of each bit of the second half data ($D_{[16]}$ to $D_{[31]}$). Moreover, when considering a logical calculation of $P_{[4]} \hat{} P_{[5]} \hat{} P_{[6]} \hat{} P_{[7]}$ (mark "$\hat{}$" represents calculation of exclusive OR (EX-OR)), calculation target data of the calculation include bits, whose number is even, out of each bit of the first half data ($D_{[0]}$ to $D_{[15]}$). Furthermore, the calculation target data of the calculation include bits, whose number is odd, out of each bit of the second half data ($D_{[6]}$ to $D_{[31]}$).

Moreover, it is assumed that, when the formulas for calculating $P_{[0]}$ to $P_{[7]}$ are calculated by use of bit values of actual data, values which are acquired by the above-mentioned calculation are denoted as $Q_{[0]}$ to $Q_{[7]}$ respectively. A bit pattern is acquired by calculating EX-OR of each bit $P_{[i]}$ (i=0, 1, 2, . . . , 7) of the error detection code and each calculated value $Q_{[i]}$ (i=0, 1, 2, . . . , 7), which is corresponding to $P_{[i]}$ (i=0, 1, 2, . . . , 7) respectively, such as $P_{[0]} \hat{} Q_{[0]}$, $P_{[1]} \hat{} Q_{[1]}$ and the like. $D_{[j]}$ used in the formulas for calculating $P_{[0]}$ to $P_{[7]}$ is selected so as to identify an error position, at which one-bit error is caused and which is stored by the storage 24, by use of the acquired bit pattern. As mentioned in the second example embodiment, in this case, $E_{[0]}$ to $E_{[7]}$ are acquired by calculating EX-OR of the calculated values $Q_{[0]}$ to $Q_{[7]}$ and the error detection code $P_{[0]}$ to $P_{[7]}$, and then the position where the error is caused is detected based on the calculated values $E_{[0]}$ to $E_{[7]}$ and position detection data shown in FIG. 14 to FIG. 16.

As mentioned above, even when the write-data size is not 64 bits but 32 bits, the storage apparatus 20 can restrain number of bits of the error detection codes assigned to the first half data and the second half data respectively by the storage apparatus 20 having the same configuration as one shown in the second example embodiment. That is, when the error detection codes each of which has a capability to detect both of occurrence of the error and the position where the error is caused are associated with the first half data and the second half data respectively, it is necessary to associate the error detection codes of 5 bits with the first half data and the second half data respectively. In contrast, in the case of the second example embodiment, each of the error detection codes assigned to the first half data and the second half data respectively may have 4-bit length. As mentioned above, the configuration of the storage apparatus 20 of the second example embodiment can restrain number of bits of the error detection code.

Moreover, the present invention is also applicable to an error detection device and a storage apparatus in which a write-data size is 128 bits. In this case, each of error detection codes associated with first half data (64 bits) and second half data (64 bits) respectively has a 5-bit length, and an error detection code $P_{[0]}$ to $P_{[9]}$ is calculated by the following calculation formulas (generation formulas). Here, when considering a logical calculation of $P_{[0]} \hat{} P_{[1]} \hat{} P_{[2]} \hat{} P_{[3]} \hat{} P_{[4]}$ (mark "$\hat{}$" represents calculation of exclusive OR (EX-OR)), calculation target data of the calculation include bits, whose number is odd, out of each bit of the first half data ($D_{[0]}$ to $D_{[63]}$). Furthermore, the calculation target data of the calculation include bits, whose number is even, out of each bit of the second half data ($D_{[64]}$ to $D_{[127]}$). Here, when considering a logical calculation of $P_{[5]} \hat{} P_{[6]} \hat{} P_{[7]} \hat{} P_{[8]} \hat{} P_{[9]}$ (mark "$\hat{}$" represents calculation of exclusive OR (EX-OR)), calculation target data of the calculation include bits, whose number is even, out of each bit of the first half data ($D_{[0]}$ to $D_{[63]}$). Furthermore, the calculation target data of the calculation include bits, whose number is odd, out of each bit of the second half data ($D_{[64]}$ to $D_{[127]}$). As mentioned in the second example embodiment, in this case, the position where the error is caused is detected based on $E_{[0]}$ to $E_{[9]}$ acquired by calculating EX-OR of the calculated values $Q_{[0]}$ to $Q_{[9]}$ and the error detection code $P_{[0]}$ to $P_{[9]}$ and the position detection data shown in FIG. 17 to FIG. 26.

$P_{[0]} = P_{[0]\_f} \hat{} P_{[0]\_s} \hat{} P_{[0]\_t} \hat{} P_{[0]\_i}$ $P_{[0]\_f} = D_{[0]} \hat{} D_{[5]} \hat{} D_{[10]} \hat{} D_{[15]} \hat{} D_{[20]} \hat{} D_{[25]} \hat{} D_{[30]}$ $P_{[0]\_s} = D_{[35]} \hat{} D_{[40]} \hat{} D_{[45]} \hat{} D_{[50]} \hat{} D_{[55]} \hat{} D_{[60]}$ $P_{[0]\_t} = D_{[64]} \hat{} D_{[65]} \hat{} D_{[66]} \hat{} D_{[67]} \hat{} D_{[68]} \hat{} D_{[69]} \hat{} D_{[70]} \hat{} D_{[71]} \hat{} D_{[72]} \hat{} D_{[73]} \hat{} D_{[74]} \hat{} D_{[75]} \hat{} D_{[76]} \hat{} D_{[77]} \hat{} D_{[78]} \hat{} D_{[79]} \hat{} D_{[80]} \hat{} D_{[81]} \hat{} D_{[82]} \hat{} D_{[83]} \hat{} D_{[89]} \hat{} D_{[90]} \hat{} D_{[91]} \hat{} D_{[92]} \hat{} D_{[93]} \hat{} D_{[94]} \hat{} D_{[95]}$ $P_{[0]\_i} = D_{[96]} \hat{} D_{[97]} \hat{} D_{[98]} \hat{} D_{[99]} \hat{} D_{[100]} \hat{} D_{[101]} \hat{} D_{[102]} \hat{} D_{[103]} \hat{} D_{[104]} \hat{} D_{[105]} \hat{} D_{[106]} \hat{} D_{[107]} \hat{} D_{[108]}$ $P_{[1]} = P_{[1]\_f} \hat{} P_{[1]\_s} \hat{} P_{[1]\_t} \hat{} P_{[1]\_i}$ $P_{[1]\_f} = D_{[1]} \hat{} D_{[6]} \hat{} D_{[11]} \hat{} D_{[16]} \hat{} D_{[21]} \hat{} D_{[26]} \hat{} D_{[31]}$ $P_{[1]\_s} = D_{[36]} \hat{} D_{[41]} \hat{} D_{[46]} \hat{} D_{[51]} \hat{} D_{[56]} \hat{} D_{[61]}$ $P_{[1]\_t} = D_{[64]} \hat{} D_{[65]} \hat{} D_{[66]} \hat{} D_{[67]} \hat{} D_{[68]} \hat{} D_{[69]} \hat{} D_{[70]} \hat{} D_{[71]} \hat{} D_{[72]} \hat{} D_{[73]} \hat{} D_{[74]} \hat{} D_{[75]} \hat{} D_{[76]} \hat{} D_{[77]} \hat{} D_{[78]} \hat{} D_{[84]} \hat{} D_{[85]} \hat{} D_{[86]} \hat{} D_{[87]} \hat{} D_{[88]} \hat{} D_{[89]} \hat{} D_{[90]} \hat{} D_{[91]} \hat{} D_{[92]} \hat{} D_{[93]}$ $P_{[1]\_l} = D_{[109]} \char`^ D_{[110]} \char`^ D_{[111]} \char`^ D_{[112]} \char`^ D_{[113]} \char`^ D_{[114]} \char`^ D_{[115]} \char`^ D_{[116]} \char`^ D_{[117]} \char`^ D_{[118]} \char`^ D_{[119]} \char`^ D_{[120]} \char`^ D_{[121]} \char`^ D_{[122]} \char`^ D_{[123]}$ $P_{[2]} = P_{[2]\_f} \char`^ P_{[2]\_s} \char`^ P_{[2]\_t} \char`^ P_{[2]\_l}$ $P_{[2]\_f} = D_{[2]} \char`^ D_{[7]} \char`^ D_{[12]} \char`^ D_{[17]} \char`^ D_{[22]} \char`^ D_{[27]}$ $P_{[2]\_s} = D_{[32]} \char`^ D_{[37]} \char`^ D_{[42]} \char`^ D_{[47]} \char`^ D_{[52]} \char`^ D_{[57]} \char`^ D_{[62]}$ $P_{[2]\_t} = D_{[64]} \char`^ D_{[65]} \char`^ D_{[66]} \char`^ D_{[67]} \char`^ D_{[68]} \char`^ D_{[69]} \char`^ D_{[70]} \char`^ D_{[71]} \char`^ D_{[72]} \char`^ D_{[73]} \char`^ D_{[79]} \char`^ D_{[80]} \char`^ D_{[81]} \char`^ D_{[82]} \char`^ D_{[83]} \char`^ D_{[84]} \char`^ D_{[85]} \char`^ D_{[86]} \char`^ D_{[87]} \char`^ D_{[88]} \char`^ D_{[89]} \char`^ D_{[94]} \char`^ D_{[95]}$ $P_{[2]\_l} = D_{[96]} \char`^ D_{[97]} \char`^ D_{[98]} \char`^ D_{[109]} \char`^ D_{[110]} \char`^ D_{[111]} \char`^ D_{[112]} \char`^ D_{[113]} \char`^ D_{[124]} \char`^ D_{[125]} \char`^ D_{[126]} \char`^ D_{[127]}$ $P_{[3]} = P_{[3]\_f} \char`^ P_{[3]\_s} \char`^ P_{[3]\_t} \char`^ P_{[3]\_l}$ $P_{[3]\_f} = D_{[3]} \char`^ D_{[8]} \char`^ D_{[13]} \char`^ D_{[18]} \char`^ D_{[23]} \char`^ D_{[28]}$ $P_{[3]\_s} = D_{[33]} \char`^ D_{[38]} \char`^ D_{[43]} \char`^ D_{[48]} \char`^ D_{[53]} \char`^ D_{[58]} \char`^ D_{[63]}$ $P_{[3]\_t} = D_{[64]} \char`^ D_{[65]} \char`^ D_{[66]} \char`^ D_{[67]} \char`^ D_{[68]} \char`^ D_{[74]} \char`^ D_{[75]} \char`^ D_{[76]} \char`^ D_{[77]} \char`^ D_{[78]} \char`^ D_{[79]} \char`^ D_{[80]} \char`^ D_{[s/l]} \char`^ D_{[82]} \char`^ D_{[83]} \char`^ D_{[84]} \char`^ D_{[85]} \char`^ D_{[86]} \char`^ D_{[87]} \char`^ D_{[88]}$ $P_{[3]\_l} = D_{[99]} \char`^ D_{[100]} \char`^ D_{[101]} \char`^ D_{[102]} \char`^ D_{[103]} \char`^ D_{[114]} \char`^ D_{[115]} \char`^ D_{[116]} \char`^ D_{[117]} \char`^ D_{[118]} \char`^ D_{[124]} \char`^ D_{[125]} \char`^ D_{[126]} \char`^ D_{[127]}$ $P_{[4]} = P_{[4]\_f} \char`^ P_{[4]\_s} \char`^ P_{[4]\_t} \char`^ P_{[4]\_l}$ $P_{[4]\_f} = D_{[4]} \char`^ D_{[9]} \char`^ D_{[14]} \char`^ D_{[19]} \char`^ D_{[24]} \char`^ D_{[29]}$ $P_{[4]\_s} = D_{[34]} \char`^ D_{[39]} \char`^ D_{[44]} \char`^ D_{[49]} \char`^ D_{[54]} \char`^ D_{[59]}$ $P_{[4]\_t} = D_{[69]} \char`^ D_{[70]} \char`^ D_{[71]} \char`^ D_{[72]} \char`^ D_{[73]} \char`^ D_{[74]} \char`^ D_{[75]} \char`^ D_{[76]} \char`^ D_{[77]} \char`^ D_{[78]} \char`^ D_{[79]} \char`^ D_{[80]} \char`^ D_{[s/l]} \char`^ D_{[82]} \char`^ D_{[83]} \char`^ D_{[84]} \char`^ D_{[85]} \char`^ D_{[86]} \char`^ D_{[87]} \char`^ D_{[88]}$ $P_{[4]\_l} = D_{[104]} \char`^ D_{[105]} \char`^ D_{[106]} \char`^ D_{[107]} \char`^ D_{[108]} \char`^ D_{[119]} \char`^ D_{[120]} \char`^ D_{[121]} \char`^ D_{[122]} \char`^ D_{[123]}$ $P_{[5]} = P_{[5]\_f} \char`^ P_{[5]\_s} \char`^ P_{[5]\_t} \char`^ P_{[5]\_l}$ $P_{[5]\_f} = D_{[0]} \char`^ D_{[1]} \char`^ D_{[2]} \char`^ D_{[3]} \char`^ D_{[4]} \char`^ D_{[5]} \char`^ D_{[6]} \char`^ D_{[7]} \char`^ D_{[8]} \char`^ D_{[9]} \char`^ D_{[10]} \char`^ D_{[11]} \char`^ D_{[12]} \char`^ D_{[13]} \char`^ D_{[14]} \char`^ D_{[15]} \char`^ D_{[16]} \char`^ D_{[17]} \char`^ D_{[18]} \char`^ D_{[19]} \char`^ D_{[25]} \char`^ D_{[26]} \char`^ D_{[27]} \char`^ D_{[28]} \char`^ D_{[29]} \char`^ D_{[30]} \char`^ D_{[31]}$ $P_{[5]\_s} = D_{[32]} \char`^ D_{[33]} \char`^ D_{[34]} \char`^ D_{[35]} \char`^ D_{[36]} \char`^ D_{[37]} \char`^ D_{[38]} \char`^ D_{[39]} \char`^ D_{[40]} \char`^ D_{[41]} \char`^ D_{[42]} \char`^ D_{[43]} \char`^ D_{[44]}$ $P_{[5]\_t} = D_{[64]} \char`^ D_{[69]} \char`^ D_{[74]} \char`^ D_{[79]} \char`^ D_{[84]} \char`^ D_{[89]} \char`^ D_{[94]}$ $P_{[5]\_l} = D_{[99]} \char`^ D_{[104]} \char`^ D_{[109]} \char`^ D_{[114]} \char`^ D_{[119]} \char`^ D_{[124]}$ $P_{[6]} = P_{[6]\_f} \char`^ P_{[6]\_s} \char`^ P_{[6]\_t} \char`^ P_{[6]\_l}$ $P_{[6]\_f} = D_{[0]} \char`^ D_{[1]} \char`^ D_{[2]} \char`^ D_{[3]} \char`^ D_{[4]} \char`^ D_{[5]} \char`^ D_{[6]} \char`^ D_{[7]} \char`^ D_{[8]} \char`^ D_{[9]} \char`^ D_{[10]} \char`^ D_{[11]} \char`^ D_{[12]} \char`^ D_{[13]} \char`^ D_{[14]} \char`^ D_{[20]} \char`^ D_{[21]} \char`^ D_{[22]} \char`^ D_{[23]} \char`^ D_{[24]} \char`^ D_{[25]} \char`^ D_{[26]} \char`^ D_{[27]} \char`^ D_{[28]} \char`^ D_{[29]}$ $P_{[6]\_s} = D_{[45]} \char`^ D_{[46]} \char`^ D_{[47]} \char`^ D_{[48]} \char`^ D_{[49]} \char`^ D_{[50]} \char`^ D_{[51]} \char`^ D_{[52]} \char`^ D_{[53]} \char`^ D_{[54]} \char`^ D_{[55]} \char`^ D_{[56]} \char`^ D_{[57]} \char`^ D_{[58]} \char`^ D_{[59]}$ $P_{[6]\_t} = D_{[65]} \char`^ D_{[70]} \char`^ D_{[75]} \char`^ D_{[80]} \char`^ D_{[85]} \char`^ D_{[90]} \char`^ D_{[95]}$ $P_{[6]\_l} = D_{[100]} \char`^ D_{[105]} \char`^ D_{[110]} \char`^ D_{[115]} \char`^ D_{[120]} \char`^ D_{[125]}$ $P_{[7]} = P_{[7]\_f} \char`^ P_{[7]\_s} \char`^ P_{[7]\_t} \char`^ P_{[7]\_l}$ $P_{[7]\_f} = D_{[0]} \char`^ D_{[1]} \char`^ D_{[2]} \char`^ D_{[3]} \char`^ D_{[4]} \char`^ D_{[5]} \char`^ D_{[6]} \char`^ D_{[7]} \char`^ D_{[8]} \char`^ D_{[9]} \char`^ D_{[15]} \char`^ D_{[16]} \char`^ D_{[17]} \char`^ D_{[ls]} \char`^ D_{[19]} \char`^ D_{[20]} \char`^ D_{[21]} \char`^ D_{[22]} \char`^ D_{[23]} \char`^ D_{[24]} \char`^ D_{[30]} \char`^ D_{[31]}$ $P_{[7]\_s} = D_{[32]} \char`^ D_{[33]} \char`^ D_{[34]} \char`^ D_{[45]} \char`^ D_{[46]} \char`^ D_{[47]} \char`^ D_{[48]} \char`^ D_{[49]} \char`^ D_{[60]} \char`^ D_{[61]} \char`^ D_{[62]} \char`^ D_{[63]}$ $P_{[7]\_t} = D_{[66]} \char`^ D_{[71]} \char`^ D_{[76]} \char`^ D_{[81]} \char`^ D_{[86]} \char`^ D_{[91]}$ $P_{[7]\_l} = D_{[96]} \char`^ D_{[101]} \char`^ D_{[106]} \char`^ D_{[111]} \char`^ D_{[116]} \char`^ D_{[121]} \char`^ D_{[126]}$ $P_{[8]} = P_{[8]\_f} \char`^ P_{[8]\_s} \char`^ P_{[8]\_t} \char`^ P_{[8]\_l}$ $P_{[8]\_f} = D_{[0]} \char`^ D_{[1]} \char`^ D_{[2]} \char`^ D_{[3]} \char`^ D_{[4]} \char`^ D_{[10]} \char`^ D_{[11]} \char`^ D_{[12]} \char`^ D_{[13]} \char`^ D_{[14]} \char`^ D_{[15]} \char`^ D_{[16]} \char`^ D_{[17]} \char`^ D_{[18]} \char`^ D_{[19]} \char`^ D_{[20]} \char`^ D_{[21]} \char`^ D_{[22]} \char`^ D_{[23]} \char`^ D_{[24]}$ $P_{[8]\_s} = D_{[35]} \char`^ D_{[36]} \char`^ D_{[37]} \char`^ D_{[38]} \char`^ D_{[39]} \char`^ D_{[50]} \char`^ D_{[51]} \char`^ D_{[52]} \char`^ D_{[53]} \char`^ D_{[54]} \char`^ D_{[60]} \char`^ D_{[61]} \char`^ D_{[62]} \char`^ D_{[63]}$ $P_{[8]\_t} = D_{[67]} \char`^ D_{[72]} \char`^ D_{[77]} \char`^ D_{[82]} \char`^ D_{[87]} \char`^ D_{[92]}$ $P_{[8]\_l} = D_{[97]} \char`^ D_{[102]} \char`^ D_{[107]} \char`^ D_{[112]} \char`^ D_{[117]} \char`^ D_{[122]} \char`^ D_{[127]}$ $P_{[9]} = P_{[9]\_f} \char`^ P_{[9]\_s} \char`^ P_{[9]\_t} \char`^ P_{[9]\_l}$ $P_{[9]\_f} = D_{[5]} \char`^ D_{[6]} \char`^ D_{[7]} \char`^ D_{[8]} \char`^ D_{[9]} \char`^ D_{[10]} \char`^ D_{[11]} \char`^ D_{[12]} \char`^ D_{[13]} \char`^ D_{[14]} \char`^ D_{[15]} \char`^ D_{[16]} \char`^ D_{[17]} \char`^ D_{[ls]} \char`^ D_{[19]} \char`^ D_{[20]} \char`^ D_{[21]} \char`^ D_{[22]} \char`^ D_{[23]} \char`^ D_{[24]}$ $P_{[9]\_s} = D_{[40]} \char`^ D_{[41]} \char`^ D_{[42]} \char`^ D_{[43]} \char`^ D_{[44]} \char`^ D_{[55]} \char`^ D_{[56]} \char`^ D_{[57]} \char`^ D_{[58]} \char`^ D_{[59]}$ $P_{[9]\_t} = D_{[68]} \char`^ D_{[73]} \char`^ D_{[78]} \char`^ D_{[83]} \char`^ D_{[88]} \char`^ D_{[93]}$ $P_{[9]\_l} = D_{[98]} \char`^ D_{[103]} \char`^ D_{[108]} \char`^ D_{[113]} \char`^ D_{[118]} \char`^ D_{[123]}$ Furthermore, in the second example embodiment, the method to detect the position where the one-bit error is caused is explained. In place of detection of the one-bit error, the detection-correction unit 26 may detect a two-bit error. In this case, for example, the detection-correction unit 26 can detect the two-bit error by use of a bit pattern composed of $E_{[0]}$ to $E_{[7]}$ which the detection-correction unit 26 calculates when acquiring both of the first half data and the second half data, and the error detection code in order to correct the error. That is, if at least one of $E_{[0]}$, $E_{[2]}$, $E_{[3]}$, $E_{[4]}$, $E_{[5]}$, $E_{[6]}$ and $E_{[7]}$ is "1", and $E_{[0]} \char`^ E_{[2]} \char`^ E_{[3]} \char`^ E_{[4]} \char`^ E_{[5]} \char`^ E_{[6]} \char`^ E_{[7]}$ (EX-OR of $E_{[0]}$ to $E_{[7]}$) is "0", it can be detected that the two-bit error is caused.

The previous description of embodiments is provided to enable a person skilled in the art to make and use the present invention. Moreover, various modifications to these example embodiments will be readily apparent to those skilled in the art, and the generic principles and specific examples defined herein may be applied to other embodiments without the use of inventive faculty. Therefore, the present invention is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. An error detection device, comprising:
circuitry configured to:
generate error detection information when writing write-data which is targeted to write in a storage unit, the storage unit being configured to store data including pieces of division-data which has a read-data size smaller than a write-data size, the error detection information being information which is associated with each piece of division-data and available in determining whether there is a bit error in the division-data, pieces of the error detection information associated with each piece of division-data in the write-data being collectively used in detecting a position of the bit error;

when reading the division-data from the storage unit, determine whether there is the bit error in the division-data by using the error detection information associated with the division-data being a target to read; and when determining that there is the bit error, detect the position of the bit error by collectively using the pieces of the error detection information associated with each piece of division-data of the write-data including the division-data having the bit error, and correct the bit error based on information on the position of the bit error so that the storage unit restrains deterioration in storage density that is caused by using the error detection information when the read-data size and the write-data size are different from each other, wherein the error detection information includes first error detection information associated with first division-data among the division-data and second error detection information associated with second division-data immediately preceded by the first division-data among the division-data, the first error detection information is generated by calculating exclusive OR of an odd number of bits of the first error detection information and an even number of bits of the second error detection information, and the second error detection information is generated by calculating exclusive OR of an even number of bits of the first error detection information and an odd number of bits of the second error detection information.

2. The error detection device according to claim 1, wherein the error detection information is a code which is generated based on an Error Correcting Code (ECC) method.

3. A storage apparatus, comprising:

a storage unit that stores data including pieces of division-data which has a read-data size smaller than a write-data size; and an error detection device including circuitry, the circuitry being configured to:

generate error detection information when writing write-data which is targeted to write in the storage unit, the error detection information being information which is associated with each piece of division-data and available in determining whether there is a bit error in the division-data, pieces of the error detection information associated with each piece of division-data in the write-data being collectively used in detecting a position of the bit error, when reading the division-data from the storage unit, determine whether there is the bit error in the division-data by using the error detection information associated with the division-data being targeted to read, and when determining that there is the bit error, detect the position of the bit error by collectively using the pieces of the error detection information associated with each piece of division-data of the write-data including the division-data having the bit error, and correct the bit error based on information on the position of the bit error so that the storage apparatus restrains deterioration in storage density that is caused by using the error detection information when the read-data size and the write-data size are different from each other, wherein the error detection information includes first error detection information associated with first division-data among the division-data and second error detection information associated with second division-data immediately preceded by the first division-data among the division-data, the first error detection information is generated by calculating exclusive OR of an odd number of bits of the first error detection information and an even number of bits of the second error detection information, and the second error detection information is generated by calculating exclusive OR of an even number of bits of the first error detection information and an odd number of bits of the second error detection information.

4. An error correction method, comprising:

generating error detection information when writing write-data which is targeted to write in a storage unit, the storage unit being configured to store data including pieces of division-data which has a read-data size smaller than a write-data size, the error detection information being information which is associated with each piece of division-data and available in determining whether there is a bit error in the division-data, pieces of the error detection information associated with each piece of division-data in the write-data being collectively used in detecting a position of the bit error;

when reading the division-data from the storage unit, determining whether there is the bit error in the division-data by using the error detection information associated with the division-data being a target to read; and when determining that there is the bit error, detecting the position of the bit error by collectively using the pieces of the error detection information associated with each piece of division-data of the write-data including the division-data having the bit error, and correct the bit error based on information on the position of the bit error so that the storage unit restrains deterioration in storage density that is caused by using the error detection information when the read-data size and the write-data size are different from each other, wherein the error detection information includes first error detection information associated with first division-data among the division-data and second error detection information associated with second division-data immediately preceded by the first division-data among the division-data, the first error detection information is generated by calculating exclusive OR of an odd number of bits of the first error detection information and an even number of bits of the second error detection information, and the second error detection information is generated by calculating exclusive OR of an even number of bits of the first error detection information and an odd number of bits of the second error detection information.

* * * * *